United States Patent
Fujisawa

(10) Patent No.: US 11,231,141 B2
(45) Date of Patent: Jan. 25, 2022

(54) DRIVING APPARATUS AND LIGHTING APPARATUS

(71) Applicant: MINEBEA MITSUMI Inc., Nagano (JP)

(72) Inventor: Shinichi Fujisawa, Akiruno (JP)

(73) Assignee: MINEBEA MITSUMI Inc., Nagano (JP)

( * ) Notice: Subject to any disclaimer, the term of this patent is extended or adjusted under 35 U.S.C. 154(b) by 1 day.

(21) Appl. No.: 16/607,238

(22) PCT Filed: Apr. 24, 2018

(86) PCT No.: PCT/JP2018/016603
§ 371 (c)(1),
(2) Date: Oct. 22, 2019

(87) PCT Pub. No.: WO2018/199088
PCT Pub. Date: Nov. 1, 2018

(65) Prior Publication Data
US 2020/0378567 A1   Dec. 3, 2020

(30) Foreign Application Priority Data

Apr. 26, 2017  (JP) .............................. JP2017-087340
Apr. 26, 2017  (JP) .............................. JP2017-087342

(51) Int. Cl.
*F21S 2/00*   (2016.01)
*F16H 21/54*  (2006.01)
(Continued)

(52) U.S. Cl.
CPC ............ *F16M 13/022* (2013.01); *F16H 21/54* (2013.01); *F16H 35/06* (2013.01); *F16M 11/08* (2013.01);
(Continued)

(58) Field of Classification Search
CPC .......... F21S 2/005; F21V 21/30; F21V 14/00; F16H 35/06; F16H 21/54; F16H 35/00;
(Continued)

(56) References Cited

U.S. PATENT DOCUMENTS 5,538,214 A      7/1996  Sinila
10,208,932 B2 *  2/2019  Matsui ................. F21V 21/28
(Continued)

FOREIGN PATENT DOCUMENTS

JP  2009-110717 A   5/2009
JP  2011-190914 A   9/2011
(Continued)

OTHER PUBLICATIONS

Partial Supplementary European Search Report dated Nov. 25, 2020 for corresponding European Application No. 18790532.8.
(Continued)

*Primary Examiner* — Tan Le
(74) *Attorney, Agent, or Firm* — Pearne & Gordon LLP

(57) ABSTRACT

A driving apparatus according to an embodiment includes an arm, an operation target, and a brake unit. The arm has one end supported by a support mechanism, and includes an electric driving source. The operation target is attached to the other end of the arm, the other end being an end on the opposite side of the one end, and is enabled to be pivoted by the driving source about one rotational axis intersecting with a direction from the one end to the other end. The brake unit secures immobility of a target gear that is a gear disposed in the arm, and that is a gear being rotated as the operation target is pivoted, when the power supply to the driving source stops.

8 Claims, 22 Drawing Sheets

(51) Int. Cl.
*F16H 35/06* (2006.01)
*F21V 21/30* (2006.01)
*F16M 11/08* (2006.01)
*F16M 11/10* (2006.01)
*F16M 13/02* (2006.01)
*F16M 11/12* (2006.01)
*F21V 14/00* (2018.01)

(52) U.S. Cl.
CPC ............ *F16M 11/10* (2013.01); *F16M 11/12* (2013.01); *F21V 21/30* (2013.01); *F21S 2/005* (2013.01); *F21V 14/00* (2013.01)

(58) Field of Classification Search
CPC ......... F16H 2035/005; F16H 2035/006; F16H 63/34; F16M 11/10; F16M 11/12; F16M 13/022; F21Y 101/00
See application file for complete search history.

(56) References Cited

U.S. PATENT DOCUMENTS

| | | | | |
|---|---|---|---|---|
| 10,215,369 | B2* | 2/2019 | Fujisawa | F21V 13/04 |
| 10,317,056 | B2* | 6/2019 | Fujisawa | F21V 21/108 |
| 2007/0019947 | A1 | 1/2007 | Shimiada | |
| 2007/0268701 | A1* | 11/2007 | Devlin | F21V 27/00 |
| | | | | 362/272 |
| 2013/0155672 | A1* | 6/2013 | Vo | F21V 21/15 |
| | | | | 362/233 |
| 2014/0177258 | A1* | 6/2014 | Gebhard | B60R 11/00 |
| | | | | 362/547 |
| 2016/0268669 | A1 | 9/2016 | Wilcox | |
| 2017/0074488 | A1 | 3/2017 | Fujisawa et al. | |
| 2018/0234001 | A1* | 8/2018 | Dalsgaard | F21V 21/15 |

FOREIGN PATENT DOCUMENTS

| | | |
|---|---|---|
| JP | 2013-015580 A | 1/2013 |
| JP | 2015-225799 A | 12/2015 |
| JP | 2015-229180 A | 12/2015 |
| JP | 2016-057560 A | 4/2016 |
| JP | 2017-002929 A | 1/2017 |
| WO | 2010/067108 A1 | 6/2010 |

OTHER PUBLICATIONS

Decision to Grant a Patent dated May 27, 2020 for corresponding Japanese Application No. 2017-087340 and English translation.
Decision to Grant a Patent dated May 27, 2020 for corresponding Japanese Application No. 2017-087342 and English translation.
International Search Report dated Jun. 19, 2018 for corresponding International Application No. PCT/JP2018/016603.
Written Opinion dated Jun. 19, 2018 for corresponding International Application No. PCT/JP2018/016603.
English translation of Written Opinion dated Jun. 19, 2018 for corresponding International Application No. PCT/JP2018/016603.
Extended European Search Report dated Feb. 26, 2021 for corresponding European Application No. 18790532.8.

* cited by examiner

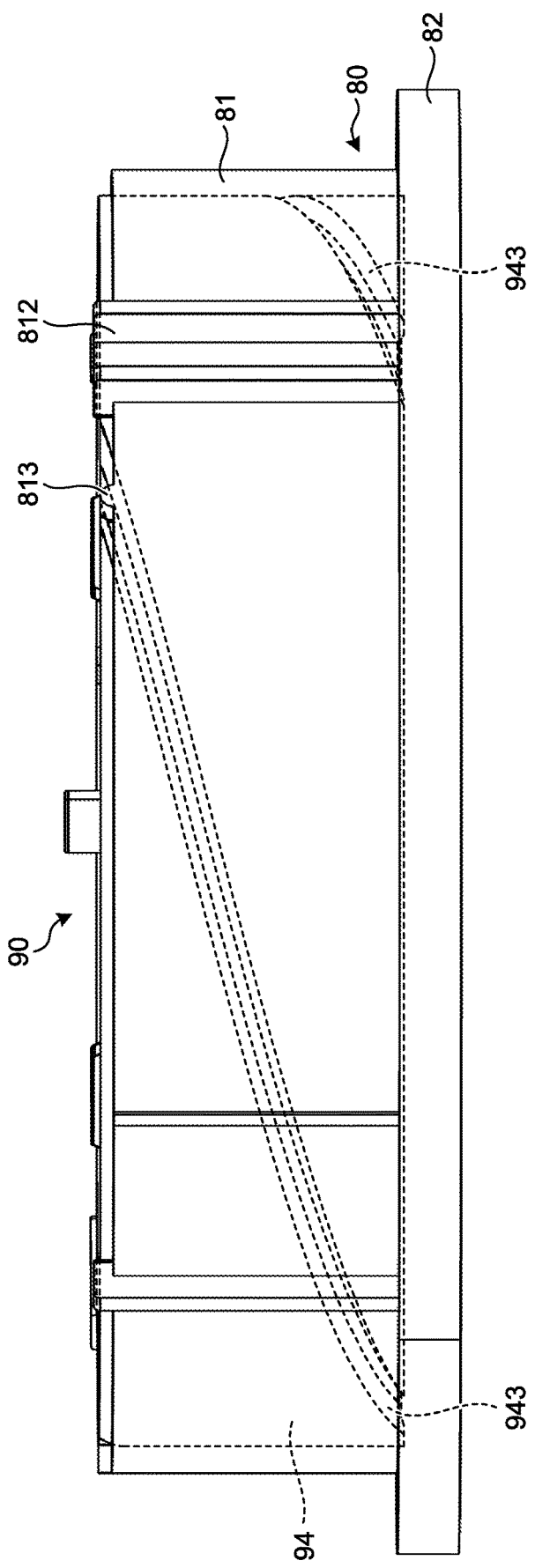

DRIVING APPARATUS AND LIGHTING APPARATUS

FIELD

The present invention relates to a driving apparatus and a lighting apparatus.

BACKGROUND

Conventionally, provided has been a lighting apparatus capable of changing the direction of light emission, such as that of a spot light, to any orientation. In such a lighting apparatus (driving apparatus), an arm extending from a supporting portion that is mounted on the ceiling surface or the like supports a lamp head pivotably about an axis, by holding the sides of the lamp head. In such a configuration, the orientation of the lamp head is changed in the horizontal directions (pan directions) by pivoting the arm supported rotatably about the supporting portion, and the orientation of the lamp head is changed in the vertical directions (tilt directions) by pivoting the lamp head supported rotatably about the arm.

CITATION LIST

Patent Literature

Patent Literature 1: Japanese Patent Application Laid-open No. 2009-110717

SUMMARY

Technical Problem

However, with the conventional technology, it is difficult to suppress inconveniences caused by the self-weight of an operation target, such as a light source or a lamp head, while allowing the orientation of the operation target to be changed. For example, in the driving apparatus described above, because the operation target is rotatably supported by the arm that holds the operation target from the sides, sometimes appropriate pivoting of the operation target is obstructed by the self-weight of the operation target, for example.

The present invention is made in consideration of the above, and it is an object of the present invention to provide a driving apparatus and a lighting apparatus capable of suppressing inconveniences caused by the self-weight of an operation target, while allowing the orientation of the operation target to be changed to a desired direction.

Solution to Problem

It is an object of the present invention to at least partially solve the problems in the conventional technology. A driving apparatus according to an embodiment includes an arm that has one end supported by a support mechanism and that includes an electric driving source, an operation target that is attached to another end of the arm, the other end being an end on an opposite side of the one end, and that is enabled to be pivoted by the driving source about one rotational axis intersecting with a direction from the one end to the other end, and a brake unit that secures immobility of a target gear that is a gear disposed on the arm, and that is rotated as the operation target is pivoted, when power supply to the driving source stops.

Advantageous Effects of Invention

According to one aspect of the present invention, it is possible to suppress inconveniences caused by the self-weight of an operation target, while enabling the orientation of the operation target to be changed to a desired direction.

BRIEF DESCRIPTION OF DRAWINGS

FIG. 26 is a schematic illustrating a zooming mechanism, with a part thereof represented transparently, in the lighting apparatus according to the embodiment.

DESCRIPTION OF EMBODIMENTS

In an embodiment described below, a lighting apparatus 1 that is an example of an apparatus including a driving apparatus 2 will now be explained with reference to some drawings. For example, the driving apparatus 2 includes, as an operation target, a lamp head 30 that includes a light source (e.g., a light-emitting element provided on a substrate 100). As an example of the driving apparatus 2, the lighting apparatus 1 including the lamp head 30 will be explained below. The embodiment described below is not intended to limit the applications of the driving apparatus 2 in any way. The driving apparatus 2 may be, without limitation to the lighting apparatus 1, applied to any apparatus that is suited to the purpose, as long as the apparatus is configured to change the orientation of the operation target to a desirable direction. Furthermore, it should be noted that the drawings are schematic representations, and a dimensional relation, a ratio, and the like between elements may be different from those in reality. Some of the drawings may include some parts represented to have different dimensional relations or ratios.

EMBODIMENT

Figure 1:
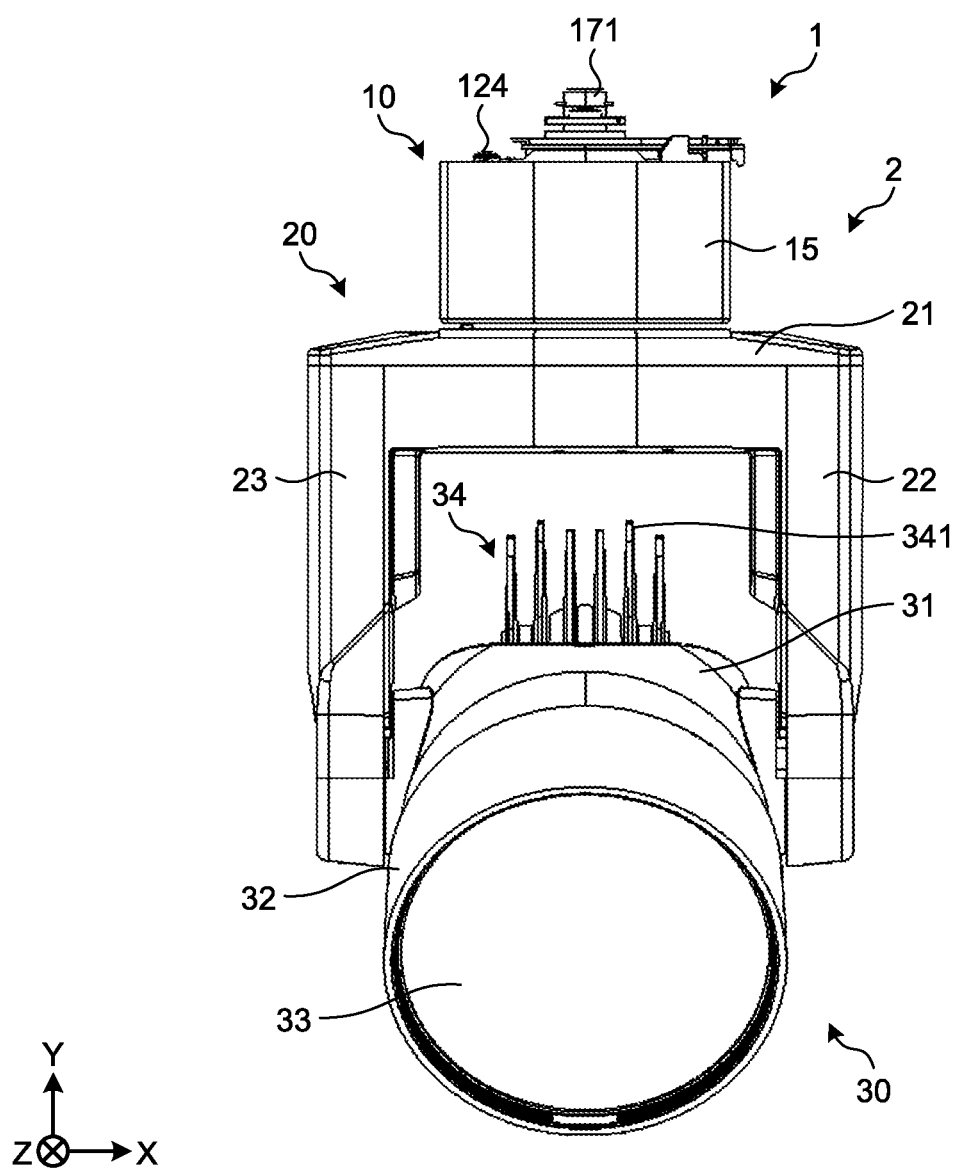
FIG. 1 is a front view illustrating a lighting apparatus according to an embodiment.

To begin with, a general configuration of the lighting apparatus 1 will be explained with reference to FIGS. 1 and 2. FIG. 1 is a front view illustrating the lighting apparatus according to the embodiment.

Specifically, FIG. 1 is a front view of the lighting apparatus 1 from a viewpoint facing the lamp head 30. FIG. 2 is a perspective view illustrating the lighting apparatus according to the embodiment. FIG. 2 is a perspective view of the lighting apparatus 1 from a viewpoint facing a second arm portion 23 of an arm 20.

In the explanation hereunder, the direction extending along the rotational axis of the arm 20, which will be described later, (hereinafter, also referred to as a "first rotational axis") is said to be an Y axis, and an X axis and a Z axis are axes perpendicularly intersecting with each other on the plane perpendicularly intersecting with Y axis. For example, the X axis is a direction extending along the rotational axis of the lamp head 30 at the position where the lighting apparatus 1 is mounted (initial position) (hereinafter, also referred to as a "second rotational axis").

The lighting apparatus 1 includes a housing box 10, the arm 20, and the lamp head 30. As illustrated in FIG. 2, the lamp head 30 is provided below the housing box 10 in the direction of the gravity (the negative direction of the Y axis), and is provided at a position overlapping with the housing box 10 in a plan view.

To begin with, a configuration of the housing box 10 will be explained with reference to FIGS. 2 to 9. As illustrated in FIGS. 2 and 3, the housing box 10 includes an outer frame 11, a top panel 12, a first bracket 13, a second bracket 14, a first cap 15, and a second cap 16. FIG. 3 is a perspective view illustrating the inside of the housing box in the lighting apparatus according to the embodiment. Specifically, FIG. 3 is a perspective view of the housing box 10, with the top panel 12 and hooks 171 removed.

To begin with, an outer shape of the housing box 10 will be explained. The outer frame 11 includes a bottom wall 111, and a pair of side walls 112, 113 that are continuous to the bottom wall 111 and that face each other. In the example illustrated in FIG. 3, the outer frame 11 includes the pair of side walls 112, 113 facing each other in the short-hand side direction of the outer frame 11, the short-hand side direction extending along the bottom wall 111, and both ends of the outer frame 11 in the longitudinal direction that extends along the bottom wall 111 are configured to be open. The outer frame 11 also has opening as an open side 114 that is a side facing the bottom wall 111.

The outer frame 11 is formed by bending an aluminum sheet metal. From the viewpoint of ensuring the strength for supporting the lamp head 30, the outer frame 11 may be formed by die-casting aluminum. While aluminum die-casting is capable of manufacturing a complex shape using a precise die, the cost is increased, disadvantageously. If the thickness or the weight is to be ensured to ensure the strength, the issue of the cost increase will be quite prominent. In this embodiment, this issue is addressed by forming the outer frame 11 by bending a thin plate-like aluminum sheet metal. Therefore, the thickness of the outer frame 11 can be reduced while keeping the cost at a low level, compared with a structure in which the outer frame 11 is formed by aluminum die-casting. Furthermore, in the configuration according to the embodiment in which the outer frame 11 is formed by bending an aluminum sheet metal, use of a precise die is not necessary. Therefore, the outer frame 11 can be manufactured easily, compared with the configuration in which the outer frame 11 is formed by aluminum die-casting. In the embodiment, iron-made brackets (the first bracket 13 and the second bracket 14 described later) are fixed to the parts of the outer frame 11 where the strength is required. With such a structure, the weight can be reduced by forming the outer frame 11 by bending an aluminum sheet metal, and the strength enough to support the lamp head 30 can be ensured at the same time.

Figure 4:
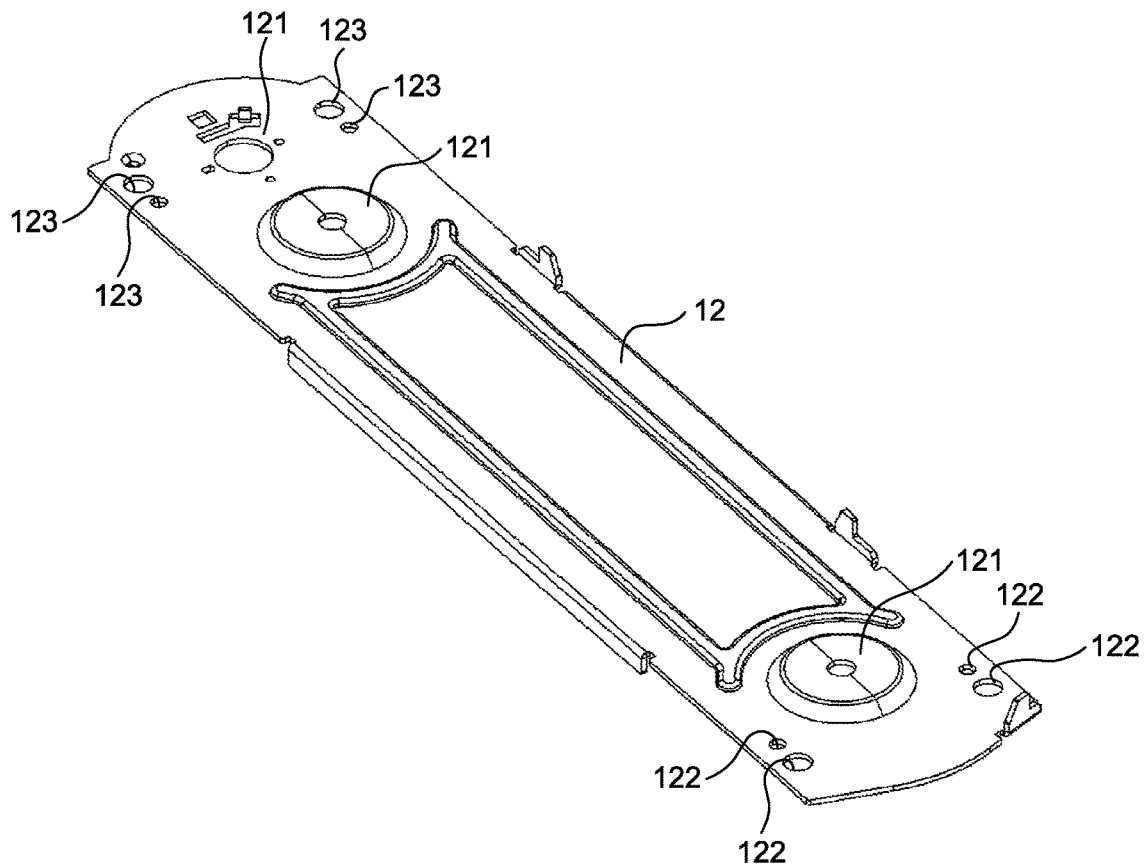
FIG. 4 is a perspective view illustrating a top panel of the lighting apparatus according to the embodiment.

As illustrated in FIG. 4, the top panel 12 is coupled to the outer frame 11 in a manner covering the open side 114 of the outer frame 11. FIG. 4 is a perspective view illustrating the top panel in the lighting apparatus according to the embodiment. Coupling of the top panel 12 to the outer frame 11 will be described later in detail. The top panel 12 is made of iron, and has a rectangular plate-like shape.

The top panel 12 includes attaching portions 121 to which the hooks 171 are attached. The housing box 10 is mounted on a predetermined object (structure) such as a ceiling, via the hooks 171 attached to the top panel 12. For example, the housing box 10 is mounted at a desired position on a rail (not illustrated) installed on the ceiling surface via the hooks 171. The hooks 171 may also be used to supply power to components inside the housing box 10, for example. Insertion holes 122 are provided to on one side of the top panel 12 in the longitudinal direction, and insertion holes 123 are provided on the other side.

The first cap 15 is provided on one end of the outer frame 11 in the longitudinal direction (on the front side in FIG. 2) in a manner covering the end surface of the one end.

Specifically, the first cap 15 is provided to the one end where the bottom wall 111 has an opening 18. The first cap 15 is made of a resin material.

The second cap 16 is provided on the other end of the outer frame 11 in the longitudinal direction (on the rear side FIG. 2) in a manner covering the end surface of the other end. The second cap 16 may be made of various materials such as resin or metal. For example, the second cap 16 may be made of a resin material, in the same manner as the first cap 15. The first cap 15 and the second cap 16 cover a pair of sides (both end surfaces) other than the sides provided with the pair of side walls 112, 113.

In the manner described above, the outer shape of the housing box 10 is formed by the outer frame 11, the top panel 12 covering the open side 114 of the outer frame 11, and the first cap 15 and the second cap 16 covering the respective ends of the outer frame 11 in the longitudinal direction.

The inside of the housing box 10 will now be explained. As illustrated in FIG. 3, the first bracket 13 and the second bracket 14 are placed, and various components such as a power supply unit 172 or a wireless communication unit 173 are housed inside of the housing box 10. For example, the power supply unit 172 is a power supply board that supplies power to a first motor 47, a second motor 61, and the substrate 100, which will be described later, for example. The power supply unit 172 is disposed along the bottom wall 111.

For example, the wireless communication unit 173 has a function for performing wireless communication, via Bluetooth (registered trademark), for example, and is a circuit board for performing wireless communications for receiving instructions for driving the first motor 47 or the second motor 61 from the outside, via the wireless communication function. The wireless communication unit 173 may include a control circuit board (control unit) for controlling the first motor 47 and the second motor 61. The wireless communication unit 173 is disposed on the one-end side of the outer frame 11 in the longitudinal direction. As illustrated in FIG. 3, the wireless communication unit 173 is disposed along the end surface, on the one-end side of the outer frame 11 in the longitudinal direction. In other words, the wireless communication unit 173 is disposed along the first cap 15 that covers the end surface of the outer frame 11 on the one-end side in the longitudinal direction.

As described above, because the first cap 15 is made of a resin material, it is possible to reduce the degree by which the first cap 15 affects the wireless communication performed by the wireless communication unit 173. The wireless communication unit 173 may also be disposed on the other side of the outer frame 11 in the longitudinal direction. In such a configuration, by using a resin material for the second cap 16, it is possible to reduce the degree by which the second cap 16 affects the wireless communication performed by the wireless communication unit 173.

Figure 5:
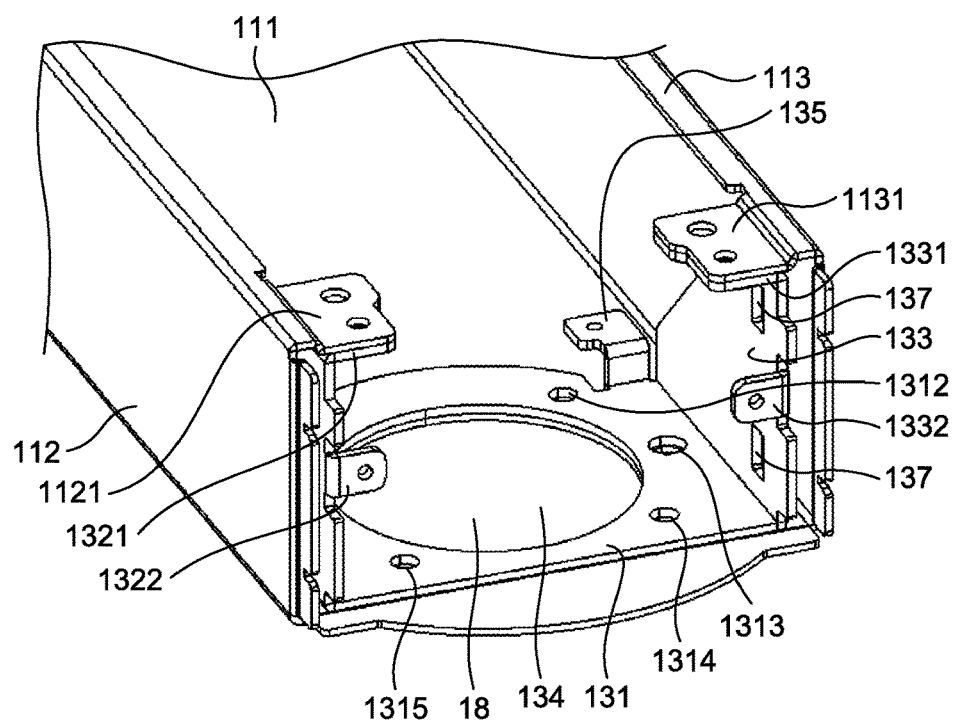
FIG. 5 is a perspective view illustrating a principal part of the housing box in the lighting apparatus according to the embodiment.

The first bracket 13 is a bracket made of iron, and disposed on the one-end side of the outer frame 11 in the longitudinal direction. Furthermore, as illustrated in FIG. 5, the first bracket 13 is provided along the inner surface of the bottom wall 111 and the inner surfaces of the pair of side walls 112, 113 of the outer frame 11. FIG. 5 is a perspective view illustrating a principal part of the housing box in the lighting apparatus according to the embodiment. Specifically, FIG. 5 is a perspective view illustrating a relation between the outer frame 11 and the first bracket 13.

Figure 6:
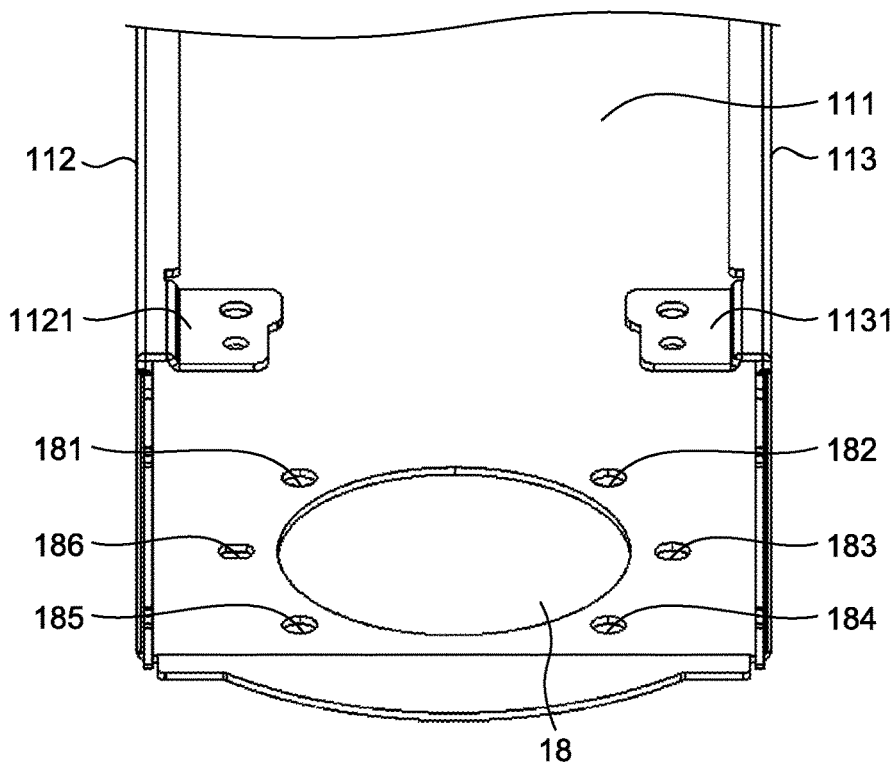
FIG. 6 is a perspective view illustrating a principal part of an outer frame of the housing box in the lighting apparatus according to the embodiment.

As illustrated in FIGS. 5 and 6, the bottom wall 111 has a circular opening 18 on the one-end side of the outer frame 11 in the longitudinal direction. FIG. 6 is a perspective view illustrating a principal part of the outer frame of the housing box in the lighting apparatus according to the embodiment. Specifically, FIG. 6 is a perspective view illustrating the one-end side where the opening 18 is provided to the bottom wall 111 of the outer frame 11. The bottom wall 111 also has six insertion holes 181 to 186 along the circumferential direction of the opening 18. A projecting piece 1121 projecting toward the side wall 113 is provided to the side wall 112 on the side of the open side 114, and on the one-end side of the outer frame 11 in the longitudinal direction. A projecting piece 1131 projecting toward the side wall 112 is provided to the side wall 113 on the side of the open side 114, and on the one-end side of the outer frame 11 in the longitudinal direction.

Figure 7:
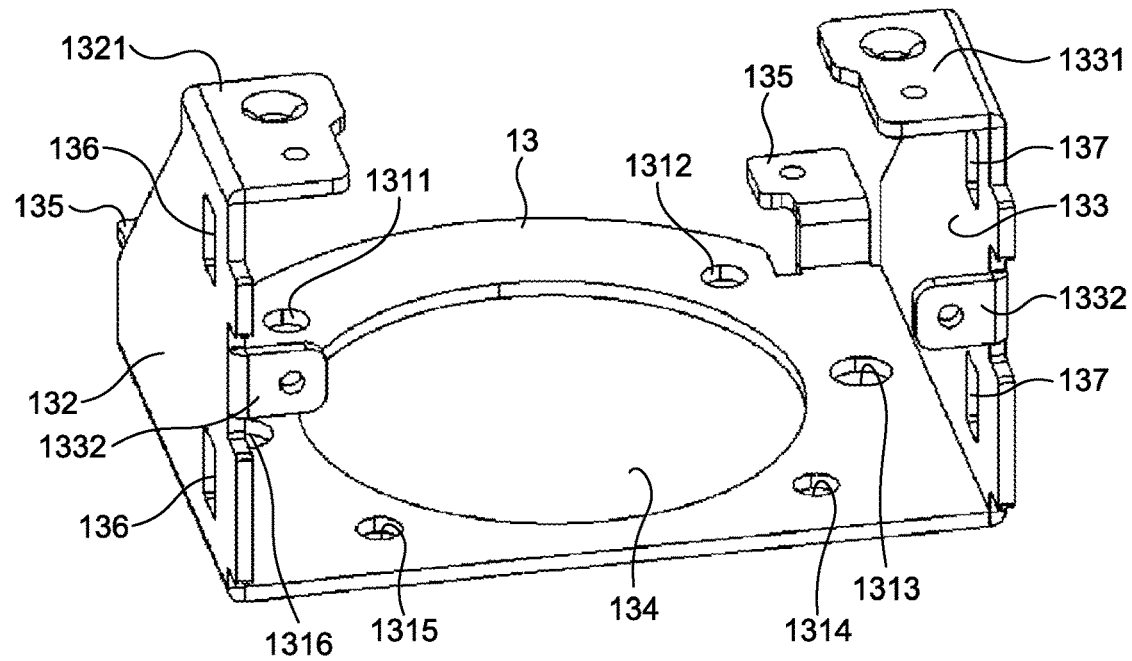
FIG. 7 is a perspective view illustrating a first bracket in the lighting apparatus according to the embodiment.

As illustrated in FIGS. 5 and 7, the first bracket 13 includes an attaching portion 131 that is a bottom portion, and a pair of side portions 132, 133 that are continuous to the attaching portion 131, and that face each other. FIG. 7 is a perspective view illustrating the first bracket in the lighting apparatus according to the embodiment. A circular opening 134 is provided to the attaching portion 131 of the first bracket 13. For example, an opening 134 having the same shape as the opening 18 of the bottom wall 111 is provided to the attaching portion 131 of the first bracket 13.

The attaching portion 131 also has six insertion holes 1311 to 1316 along the circumferential direction of the opening 134. A projecting piece 1321 projecting toward the side portion 133 is provided to a tip end of the side portion 132, the tip end being an end in a direction moving away from the attaching portion 131. Furthermore, a projecting piece 1331 projecting toward the side portion 132 is provided to a tip end of the side portion 133, the tip end being an end in a direction moving away from the attaching portion 131.

As illustrated in FIG. 5, the first bracket 13 is disposed in such a manner that the opening 134 of the attaching portion 131 overlaps with the opening 18 provided to the bottom wall 111. The six insertion holes 1311 to 1316 of the attaching portion 131 overlap with the six insertion holes 181 to 186, provided to the bottom wall 111, respectively. The projecting piece 1321 provided to the side portion 132 overlaps with the projecting piece 1121 of the side wall 112, from the side of the bottom wall 111. The projecting piece 1331 provided to the side portion 133 overlaps with the projecting piece 1131 of the side wall 113, from the side of the bottom wall 111. In the manner described above, the first bracket 13 is disposed along the inner surface of the outer frame 11.

The top panel 12 is attached to the projecting piece 1121 on the side wall 112 and the projecting piece 1321 on the side portion 132. The top panel 12 is attached to the first bracket 13 via the insertion holes 122 provided to the top panel 12, the insertion holes 122 being provided at the position overlapping with the projecting piece 1121 of the side wall 112. For example, the top panel 12 is attached to the first bracket 13 via a screwing mechanism including the insertion holes provided to the projecting piece 1121 and the projecting piece 1321, being provided at positions overlapping with the insertion holes 122 of the top panel 12, the insertion holes 122 provided to the top panel 12, and screw members 124.

The top panel 12 is also attached to the projecting piece 1131 of the side wall 113 and the projecting piece 1331 of the side portion 133. The top panel 12 is attached to the first bracket 13 via the insertion holes 122 provided to the top panel 12, being provided at positions overlapping with the projecting piece 1131 of the side wall 113. For example, the top panel 12 is attached to the first bracket 13 via a screwing mechanism including the insertion holes provided to the projecting piece 1131 and the projecting piece 1331, being provided at positions overlapping with the insertion holes 122 of the top panel 12, the insertion holes 122 provided to the top panel 12, and screw members 124. In this manner, the top panel 12 is attached to the first bracket 13, with the projecting piece 1131 of the outer frame 11 interposed therebetween.

Furthermore, the power supply unit 172 is attached to the first bracket 13 via an attachment piece 135 provided to the attaching portion 131. For example, the power supply unit 172 is attached to the first bracket 13 via a screwing mechanism including an attaching member 1721, the insertion holes provided to the attachment piece 135, and a screw member. For example, the wireless communication unit 173 is also attached to the first bracket 13, via an attachment piece 1322 provided to the side portion 132 and an attachment piece 1332 provided to the side portion 133. For example, the wireless communication unit 173 is attached to the first bracket 13 via a screwing mechanism including attaching members 1731, insertion holes provided to the attachment pieces 1322, 1332, and screw members.

As illustrated in FIG. 5, the side wall 112 is separated from the side portion 132, and there is a gap between the side wall 112 and the side portion 132. The side wall 113 is separated from the side portion 133, and there is a gap between the side wall 113 and the side portion 133.

The first cap 15 is also attached to the first bracket 13, via an attachment groove 136 provided to the side portion 132 and an attachment groove 137 provided to the side portion 133. For example, a claw (not illustrated) provided to the first cap 15 on the side of the side wall 112 is inserted into the gap between the side wall 112 and the side portion 132, and is hooked onto the attachment groove 136 provided to the side portion 132. Furthermore, for example, a claw (not illustrated) provided to the first cap 15 on the side of the side wall 113 is inserted into the gap between the side wall 113 and the side portion 133, and is hooked onto the attachment groove 137 provided to the side portion 133. In this manner, the first cap 15 is attached to the first bracket 13. In the manner described above, the design of the housing box 10 can be improved by disposing a cap attaching mechanism inside of the outer frame 11.

The second bracket 14 is a bracket made of iron, disposed on the other-end side of the outer frame 11 in the longitudinal direction. Furthermore, as illustrated in FIG. 3, the second bracket 14 is provided along the inner surface of the bottom wall 111 and the inner surfaces of the pair of side walls 112, 113 of the outer frame 11.

Figure 8:
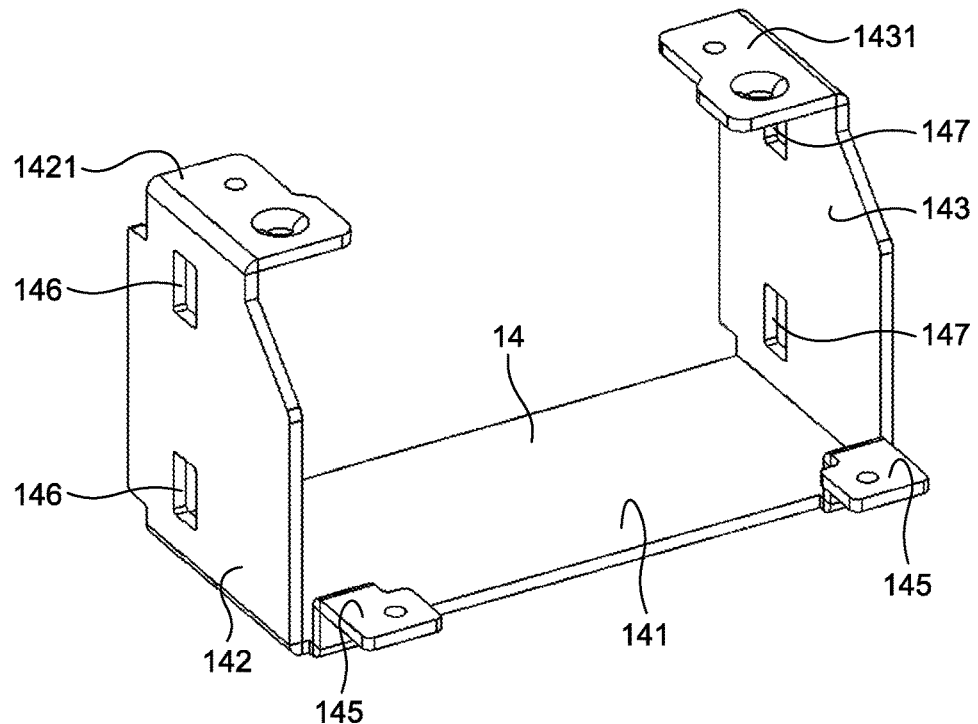
FIG. 8 is a perspective view illustrating a second bracket in the lighting apparatus according to the embodiment.

As illustrated in FIGS. 3 and 8, the second bracket 14 includes a bottom portion 141, and a pair of side portions 142, 143 that are continuous to the bottom portion 141, and that face each other. FIG. 8 is a perspective view illustrating the second bracket in the lighting apparatus according to the embodiment. A projecting piece 1421 projecting toward a side portion 143 is provided to a tip end of the side portion 142, the tip end being an end in a direction moving away from the bottom portion 141. A projecting piece 1431 projecting toward the side portion 142 is provided to an end of the side portion 143, the end being an end in a direction moving away from the bottom portion 141.

As illustrated in FIG. 3, the second bracket 14 is disposed along the inner surface of the outer frame 11. The top panel 12 is attached to a projecting piece 1122 of the side wall 112 and the projecting piece 1421 of the side portion 142. The top panel 12 is attached to the second bracket 14 via the insertion holes 123 on the top panel 12, the insertion holes 123 being provided at the position overlapping with the projecting piece 1122 of the side wall 112. For example, the top panel 12 is attached to the second bracket 14 via a screwing mechanism including insertion holes provided to the projecting piece 1122 and to the projecting piece 1421, being provided at positions overlapping with the respective insertion holes 123 of the top panel 12, the insertion holes 123 provided to the top panel 12, and screw members 124.

The top panel 12 is also attached to a projecting piece 1132 of the side wall 113 and the projecting piece 1431 of the side portion 143. The top panel 12 is attached to the second bracket 14 via the insertion holes 123 provided to the top panel 12, the insertion holes 123 being provided at positions overlapping with the projecting piece 1132 of the side wall 113. For example, the top panel 12 is attached to the second bracket 14 via a screwing mechanism including the insertion holes provided to the projecting piece 1132 and the projecting piece 1431, being provided at positions overlapping with the insertion holes 123 of the top panel 12, the insertion holes 123 of the top panel 12, and the screw members 124. In this manner, the top panel 12 is attached to the second bracket 14, with the projecting piece 1132 of the outer frame 11 interposed therebetween.

The power supply unit 172 is also attached to the second bracket 14, via attachment pieces 145 provided to the bottom portion 141. For example, the power supply unit 172 is attached to the second bracket 14 via a screwing mechanism including attaching members 1722, insertion holes provided to the attachment pieces 145, and screw members.

As illustrated in FIG. 3, the side wall 112 is separated from the side portion 142, and there is a gap between the side wall 112 and the side portion 142. The side wall 113 is separated from the side portion 143, and there is a gap between the side wall 113 and the side portion 143.

The second cap 16 is also attached to the second bracket 14, via an attachment groove 146 provided to the side portion 142, and an attachment groove 147 provided to the side portion 143. For example, a claw (not illustrated) provided to the second cap 16 on the side of the side wall 112 is inserted into the gap between the side wall 112 and the side portion 142, and is hooked onto the attachment groove 146 provided to the side portion 142. Furthermore, for example, a claw (not illustrated) provided to the second cap 16 on the side of the side wall 113 is inserted into the gap between the side wall 113 and the side portion 143, and is hooked onto the attachment groove 147 provided to the side portion 143. In this manner, the second cap 16 is attached to the second bracket 14. In the manner described above, the design of the housing box 10 can be improved by disposing a cap attaching mechanism inside of the outer frame 11.

Furthermore, in the embodiment, because the outer frame 11 of the housing box 10 is formed by bending a thin plate-like aluminum sheet metal, as described above, the outer frame 11 can be formed easily without any use of a precise die, while keeping the cost at a low level, compared with a structure in which the outer frame 11 is formed by aluminum die-casting. Furthermore, because the first bracket 13 and the second bracket 14 made of iron are fixed to the respective ends of the outer frame 11 of the housing box 10 in the longitudinal direction, the weight can be reduced by forming the outer frame 11 by bending a thin plate-like aluminum sheet metal, and a sufficient strength can be achieved at the same time by reinforcing the parts of the outer frame 11 requiring the strength, using the first bracket 13 and the second bracket 14 made of iron. Furthermore, the design can be improved by covering the end surfaces of the outer frame 11 in the longitudinal direction with the first cap 15 and the second cap 16, respectively. In the housing box 10, it is also possible to cover the end surfaces of the outer frame 11 in the longitudinal direction by bending the aluminum sheet metal with which the outer frame 11 is formed.

Figure 9:
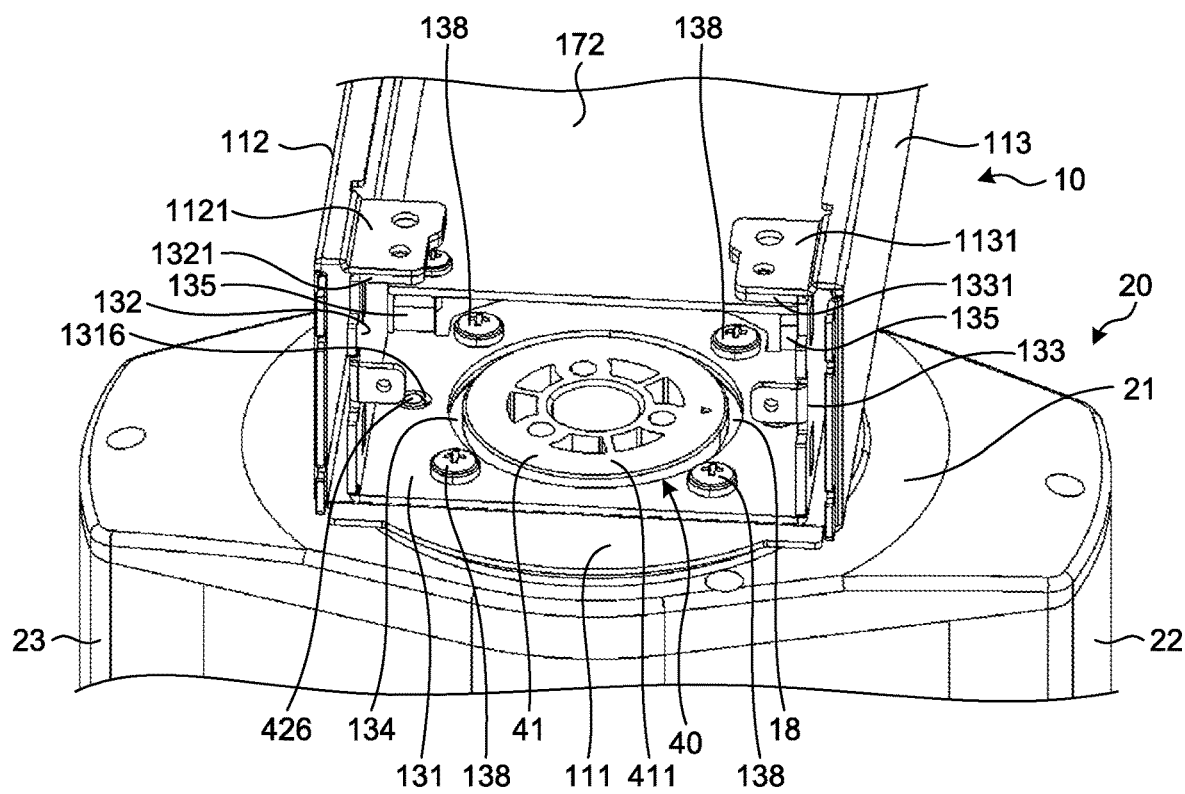
FIG. 9 is a perspective view illustrating a part where the housing box is coupled to an arm in the lighting apparatus according to the embodiment.
Figure 10:
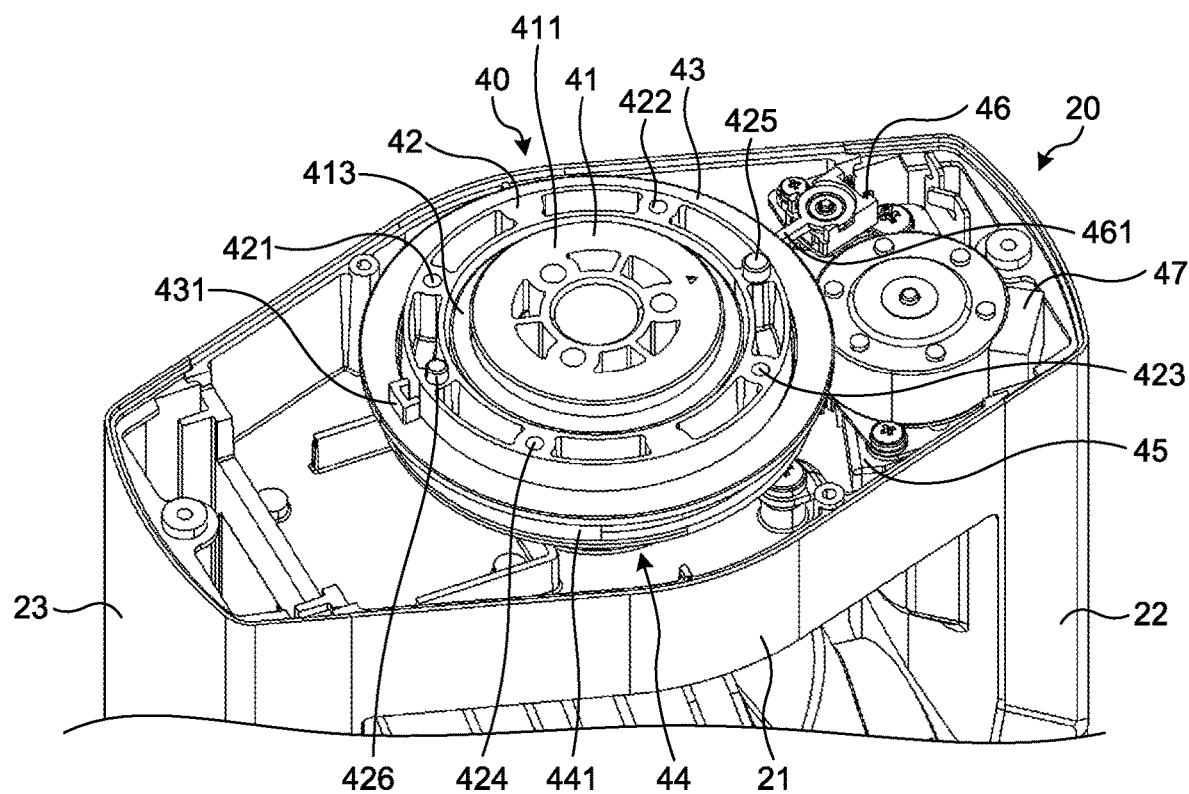
FIG. 10 is a perspective view illustrating inside of a coupling portion of the arm in the lighting apparatus according to the embodiment.

A configuration by which the housing box 10 supports a supported object including the lamp head 30, and a configuration of the supported object will now be explained. The housing box 10 supports the supported object including the lamp head 30, on the side of the bottom wall 111. For example, the housing box 10 supports the arm 20 and the lamp head 30 as the supported object. As illustrated in FIGS. 9 and 10, the arm 20 is attached to the attaching portion 131 of the first bracket 13 of the housing box 10, via a first pivoting portion 40 provided at a coupling portion 21 of the arm 20. FIG. 9 is a perspective view illustrating a part where the housing box is coupled to the arm in the lighting apparatus according to the embodiment. FIG. 10 is a perspective view illustrating the inside of the coupling portion of the arm in the lighting apparatus according to the embodiment.

The first pivoting portion 40 includes a first axial rod 41, a first member 42, a ring member 43, a second member 44, and a first base plate 45. The first axial rod 41 has a columnar shape, and has one end 411 the outer diameter of which is larger than that of another part of the first axial rod 41.

The first member 42 is made of a metallic material, and has a cylindrical shape. For example, aluminum is used for the first member 42. The first member 42 has insertion holes 421 to 424 along the circumferential edge on the bottom surface thereof. For example, the insertion holes 421 to 424 are provided to the first member 42 at an equal interval, along the circumferential edge on the bottom surface. The first member 42 also has projecting portions 425, 426 projecting from the circumferential edge of the bottom surface. For example, the projecting portions 425, 426 are provided as a pair, at positions facing each other across the axis of the first member 42 therebetween, on the circumferential edge of the bottom surface of the first member 42. The first axial rod 41 is inserted into the first member 42 from the side of the other end 412, which is on the opposite side of the one end 411. The other end 412 of the first axial rod 41 projects out from the first member 42. Furthermore, as illustrated in FIG. 10, the inner diameter of the first member 42 is larger than the outer shape of the first axial rod 41, and a bearing 413 is disposed between the first member 42 and the first axial rod 41. The one end 411 of the first axial rod 41 is disposed above the bearing 413. With this configuration, the first axial rod 41 is rotatably disposed inside of the housing box 10 and the first member 42.

As illustrated in FIG. 9, the first axial rod 41 is disposed in such a manner that the one end 411 is inserted into the opening 134 of the first bracket 13 and the opening 18 of the outer frame 11. The first member 42 is also attached to the bottom wall 111 of the outer frame 11 and the attaching portion 131 of the first bracket 13, with screw members 138. For example, by screwing the screw member 138 passed through the insertion hole 181 of the outer frame 11 and the insertion hole 1311 of the first bracket 13 into the insertion hole 421, the first member 42 is attached to the outer frame 11 and the first bracket 13. Furthermore, for example, by screwing a screw member 138 passed through the insertion hole 182 of the outer frame 11 and the insertion hole 1312 of the first bracket 13, into the insertion hole 422, the first member 42 is attached to the outer frame 11 and the first bracket 13.

Still furthermore, for example, by screwing screw member 138 passed through the insertion hole 184 of the outer frame 11 and the insertion hole 1314 of the first bracket 13, into the insertion hole 423, the first member 42 is attached to the outer frame 11 and the first bracket 13. Still furthermore, for example, by screwing a screw member 138 passed through the insertion hole 185 of the outer frame 11 and the insertion hole 1315 of the first bracket 13, into the insertion hole 424, the first member 42 is attached to the outer frame 11 and the first bracket 13.

Furthermore, for example, the position of the first member 42 with respect to the outer frame 11 and the first bracket 13 is fixed by passing the projecting portion 425 into the insertion hole 183 of the outer frame 11 and the insertion hole 1313 of the first bracket 13.

Furthermore, for example, the position of the first member 42 with respect to the outer frame 11 and the first bracket 13 is fixed, by passing the projecting portion 426 into the insertion hole 186 of the outer frame 11 and the insertion hole 1316 of the first bracket 13. In this manner, the first member 42 is attached to the outer frame 11 and the first bracket 13.

Figure 11:
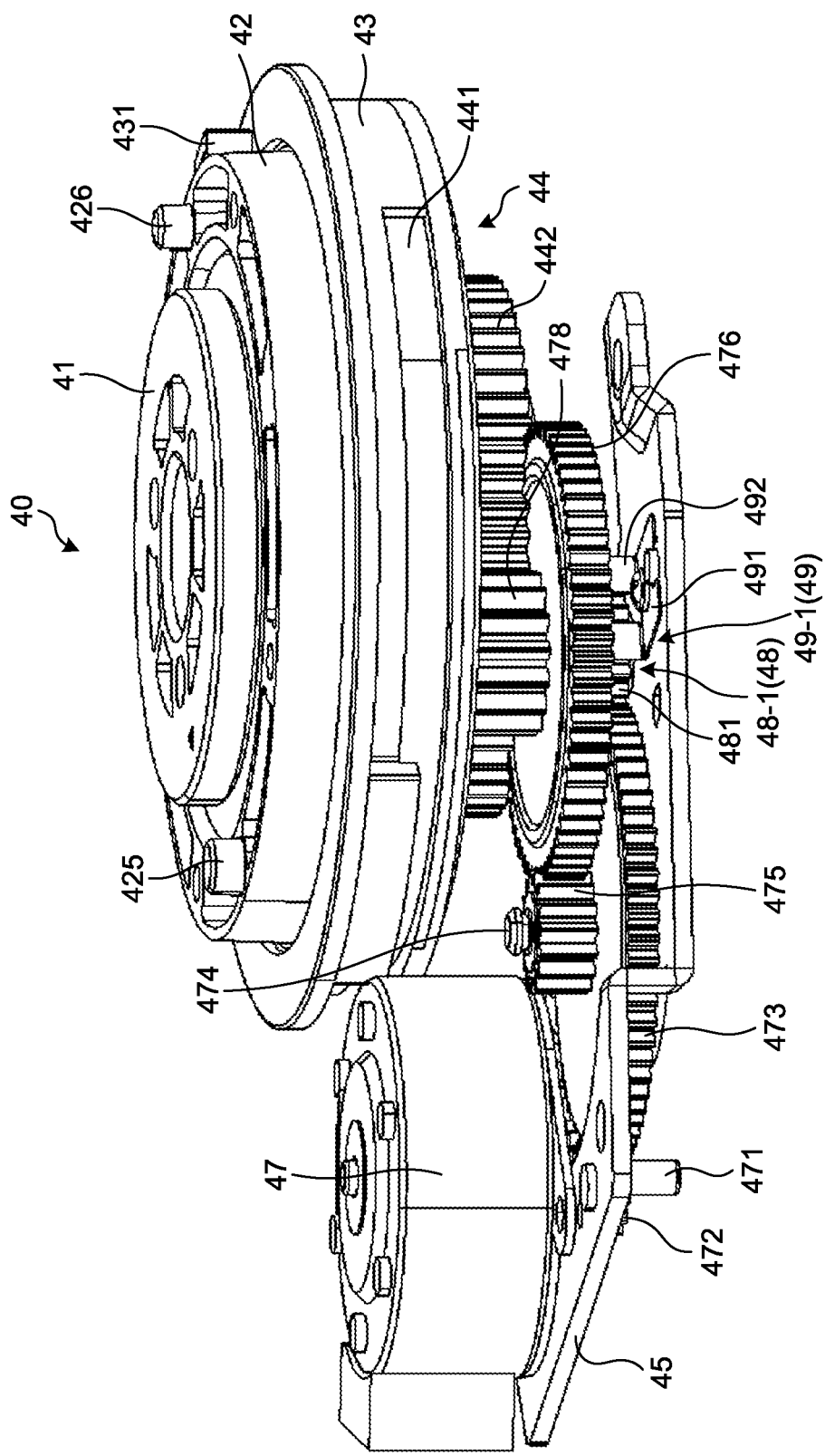
FIG. 11 is a perspective view illustrating the inside of the coupling portion of the arm in the lighting apparatus according to the embodiment.
Figure 12:
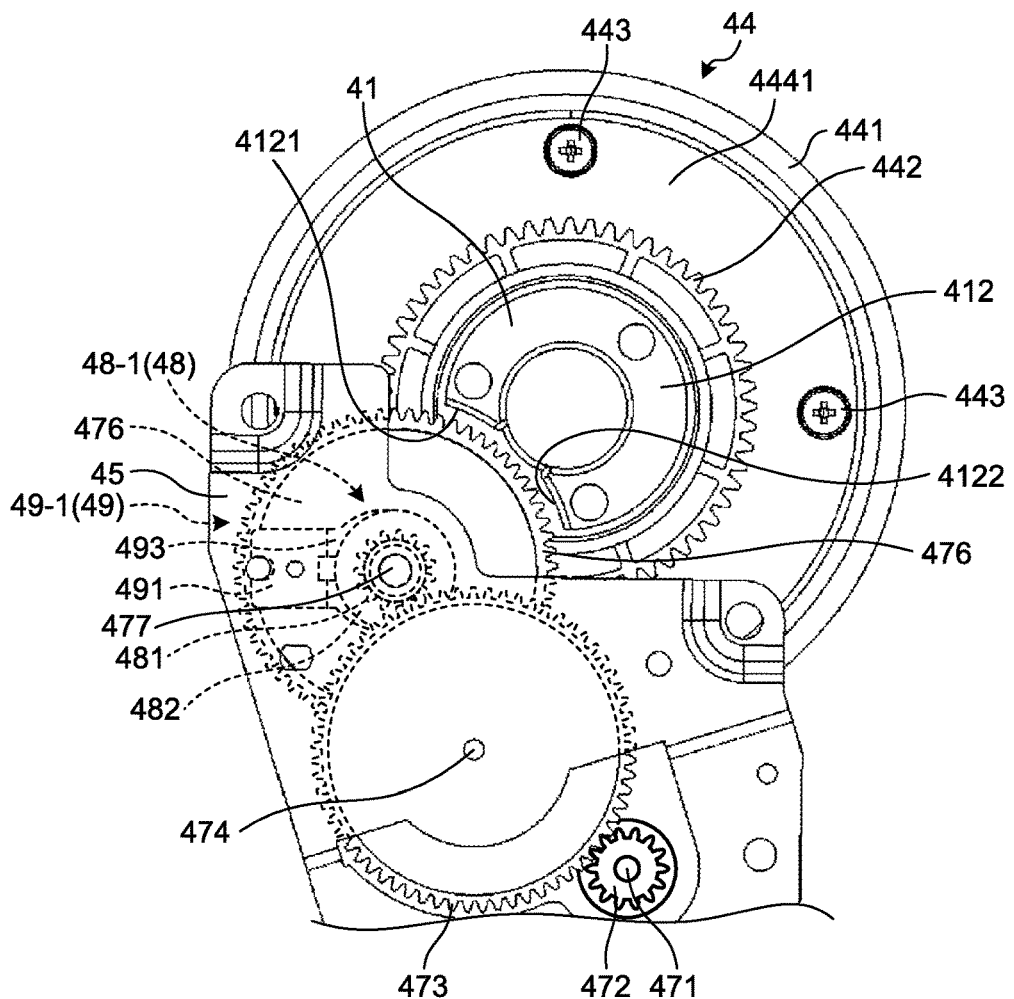
FIG. 12 is a plan view illustrating the inside of the coupling portion of the arm in the lighting apparatus according to the embodiment.

The second member 44 includes a holder unit 441 that has a cylindrical shape with a bottom, and that has an inner diameter larger than the outer diameter of the first member 42, and a gear portion 442 that is provided on the side of a bottom wall 4441 of the holder unit 441, that has a cylindrical shape having a diameter smaller than that of the holder unit 441, and the outer circumference of which is provided with a gear. The second member 44 is made of a resin material, for example. As illustrated in FIGS. 11 and 12, the first member 42 is disposed inside of the holder unit 441 of the second member 44, and is attached to the second member 44. FIG. 11 is a perspective view illustrating inside of the coupling portion of the arm in the lighting apparatus according to the embodiment. FIG. 12 is a plan view illustrating inside of the coupling portion of the arm in the lighting apparatus according to the embodiment.

As illustrated in FIG. 12, inside of the holder unit 441 is communicated with the inside of the gear portion 442, and the first axial rod 41 is passed through the second member 44. By screwing screw members 443 into the insertion holes provided to the rear side on the bottom surface of the first member 42 that is provided with the insertion holes 421 to 424, and the insertion holes provided to the bottom wall 4441 of the holder unit 441, the second member 44 is attached to the first member 42. By using the first member 42 made of a metallic material in the part where the first member 42 is coupled to the housing box 10, and using the second member 44 made of a resin material for the gear portion, the weight reduction can be achieved while ensuring the strength of the part to which an external force such as that of rotation is applied.

Furthermore, as illustrated in FIG. 12, the first axial rod 41 is passed through the gear portion 442 of the second member 44, and the other end 412 projects out from the second member 44. Furthermore, for example, by disposing the other end 412 of the first axial rod 41 in a holder unit (not illustrated) provided inside of the coupling portion 21, the first axial rod 41 is passed through the arm 20 with the position thereof restricted in the rotating direction about the first rotational axis. For example, because side surfaces 4121, 4122 that are provided along the circumferential direction of the other end 412 are disposed so as to be brought into abutment against a restricting surface (not illustrated) provided to the coupling portion 21 in a rotating direction about the first rotational axis, the first axial rod 41 is passed through the arm 20 with its position restricted with respect to the arm 20 in the rotating direction about the first rotational axis. In this manner, the first axial rod 41 pivots about the first rotational axis, together with the arm 20.

The ring member 43 having a cylindrical shape is disposed along the outer circumference of the holder unit 441 of the second member 44. The ring member 43 has an inner diameter that is larger than the outer diameter of the holder unit 441. A predetermined mechanism restricts the position of the ring member 43 with respect to the second member 44 in the rotating direction about the first rotational axis, and the ring member 43 rotates together with the second member 44. For example, the ring member 43 has a cutout groove (not illustrated) provided on the inner circumference, and the cutout groove is engaged with a projecting piece (not illustrated) projecting from the outer circumference of the holder unit 441, so that the position of the ring member 43 with respect to the second member 44 in the rotating direction about the first rotational axis is restricted. A projecting portion 431 provided to the flat surface of the ring member 43 is brought into abutment against a projection (not illustrated) provided to the coupling portion 21, and substantially serves as a stopper with respect to the coupling portion 21.

As illustrated in FIG. 10, the first base plate 45 is disposed inside of the coupling portion 21, and is attached to the arm 20 with screws, for example. On the first base plate 45, a first switch 46 is provided at a position along the outer circumference of the ring member 43. For example, the first switch 46 is provided with a lever 461 projecting toward the ring member 43. For example, the lever 461 of the first switch 46 projects into a restricting groove (not illustrated) that is provided as a cutout on the circumferential wall of the ring member 43, the cutout being cut along the circumferential direction.

The limits defining a specified rotational angle are detected by allowing the ends of the restricting groove in the circumferential direction of the ring member 43 to pivot the lever 461 of the first switch 46, and the detections are used in motor control, e.g., to stop the operation of the first motor 47. For example, the first switch 46 and the restricting groove on the ring member 43 set the rotational angle of the first base plate 45, that is, that of the arm 20 in the rotating direction about the first rotational axis to a desired range that is based on a range of the restricting groove in the circumferential direction.

The first pivoting portion 40 also includes a first motor 47 serving as a first driving source. As illustrated in FIG. 10, the first motor 47 is attached to the first base plate 45. For example, a stepping motor is used as the first motor 47.

A gear 472 is attached to an output rotational axis 471 of the first motor 47. The gear 472 mounted on the output rotational axis 471 of the first motor 47 is enmeshed with a large-diameter gear 473. A small-diameter gear 475 is mounted on a rotational axis 474 to which the large-diameter gear 473 is attached. In other words, the large-diameter gear 473 and the small-diameter gear 475 rotate about the rotational axis 474. The large-diameter gear 473 and the small-diameter gear 475 may be integrally formed. For example, a rotational axis such as the output rotational axis 471 or the rotational axis 474 is also referred to as a shaft.

The small-diameter gear 475 is enmeshed with a large-diameter gear 476. A small-diameter gear 478 is mounted on a rotational axis 477 to which the large-diameter gear 476 is attached. In other words, the large-diameter gear 476 and the small-diameter gear 478 rotate about the rotational axis 477. The large-diameter gear 476 and the small-diameter gear 478 may be integrally formed.

The small-diameter gear 478 is enmeshed with the gear portion 442 of the second member 44. The second member 44 is attached to the first member 42 in the manner described above, and the first member 42 is attached to the housing box 10. Therefore, the small-diameter gear 478 rotates along the gear portion 442, in response to an output from the first motor 47. In this manner, the arm 20 pivots about the first rotational axis, in response to the output of the first motor 47.

As illustrated in FIG. 12, an idle gear 48-1 (48) that is a target gear is mounted on the rotational axis 477. For example, the idle gear 48-1 is mounted between the large-diameter gear 476 and the first base plate 45. Because the idle gear 48-1 has the same structure as that of an idle gear 48-2 described later, except these idle gears are provided at different positions, hereinafter, the idle gears 48-1, 48-2 will be referred to as an idle gear 48, when the idle gears are explained without distinguishing from each other.

Figure 13:
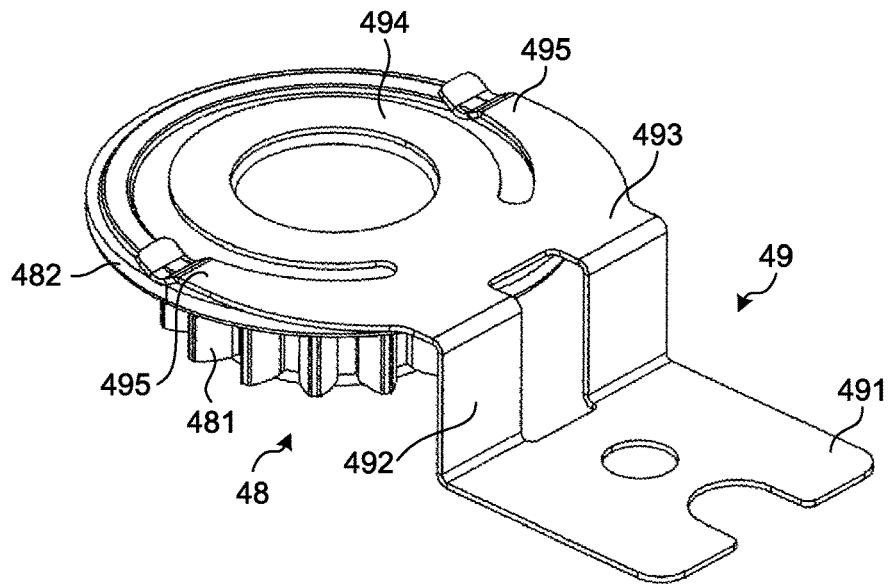
FIG. 13 is a perspective view illustrating a relation between a biasing unit and a target gear in the lighting apparatus according to the embodiment.

The tip end of the rotational axis 477 on which the idle gear 48-1 is mounted is passed through an insertion hole provided to the first base plate 45. As illustrated in FIG. 13, the idle gear 48 has a gear portion 481 where the gear is provided, and a flange 482 having a diameter larger than that of the gear portion 481. FIG. 13 is a perspective view illustrating a relation between a biasing unit and the target gear in the lighting apparatus according to the embodiment. For example, the idle gear 48-1 is disposed in such a manner the flange 482 faces the large-diameter gear 476, and the gear portion 481 faces the first base plate 45. Damper grease is provided between the idle gear 48-1 and the rotational axis 477. With the damper grease, viscous resistance can be generated between the idle gear 48-1 and the rotational axis 477.

As illustrated in FIG. 12, the gear portion 481 of the idle gear 48-1 is enmeshed with the large-diameter gear 473. In this manner, the idle gear 48-1 is enmeshed with the large-diameter gear 473 that is a gear in a communication path for communicating the driving power from the first motor 47 that is the driving source to the housing box 10 that is a supporting portion. In other words, the idle gear 48-1 is enmeshed with the large-diameter gear 473 that forms a communication path for communicating the driving power from the first motor 47 to the gear portion 442 of the second member 44 that is attached to the housing box 10.

As illustrated in FIG. 12, a biasing unit 49-1 (49) for applying a biasing force to the idle gear 48 in the axial direction of the idle gear 48 is attached to the first base plate 45. With this structure, the biasing unit 49-1 is attached to the arm 20. Because the biasing unit 49-1 has the same structure as that of a biasing unit 49-2 described later, except these biasing unit are provided are different positions, hereinafter, the biasing units 49-1, 49-2 will be referred to as a biasing unit 49, when the biasing units are explained without distinguishing from each other.

The biasing unit 49 includes an attaching portion 491 that is a base portion, and an upright portion 492 that is provided upright from one end of the attaching portion 491. The biasing unit 49 also has an extending portion 493 extending from the tip end of the upright portion 492, and extending in a direction intersecting with the direction in which the upright portion 492 extends upright. The extending portion 493 has a disk-shaped inserting portion 494 having a through-hole at the center, and a pair of arms 495, 495 extending along the outer circumference of the inserting portion 494.

As illustrated in FIGS. 12 and 13, the biasing unit 49-1 is disposed in such a manner that the extending portion 493 is laid along the flange 482 of the idle gear 48. For example, the extending portion 493 of the biasing unit 49-1 is disposed between the large-diameter gear 476 and the idle gear 48, and the rotational axis 477 is passed through the through-hole on the inserting portion 494. The pair of arms 495, 495 are brought into abutment against the flange 482 of the idle gear 48, as an abutting portion. Specifically, the pair of arms 495, 495 are brought into abutment against the outer circumferential edge of the flange 482.

The biasing unit 49 applies a biasing force to the idle gear 48 via the pair of arms 495, 495, in a direction opposite to the direction in which the upright portion 492 extends from the attaching portion 491. The biasing unit 49 applies a biasing force to the idle gear 48 in the axial direction of the idle gear 48. The biasing unit 49 applies a biasing force to the idle gear 48 in the axial direction so that the pair of arms 495, 495 press the idle gear 48 against the first base plate 45.

As described above, in the configuration in which the lighting apparatus 1 is provided with the biasing unit 49-1, and the biasing unit 49-1 applies a biasing force to the idle gear 48 in the axial direction, because a sliding resistance is generated between the idle gear 48 and the first base plate 45, the idle gear 48 rotates less easily, and therefore, a mechanical holding force can be generated.

As described earlier, in a configuration in which a stepping motor is used as the first motor 47, because the position of the rotor is controlled by the magnetic field when the power is supplied thereto, the position where the gear 472 mounted on the output rotational axis 471 of the first motor 47 is enmeshed with the large-diameter gear 473 is maintained, so that the tilt angle of the lighting apparatus 1 is maintained at a desired position. When the power supply stops (with no generation of the magnetic field), the force for mechanically maintaining the position may weaken, compared with when the power is being supplied. If the force for mechanically maintaining the position weakens, the orientation of the lighting apparatus 1 may become inclined toward the center of gravity of the lamp head 30, and the stability of the operation of the lighting apparatus 1 becomes a concern. Such an inconvenience due to the self-weight of the lighting apparatus 1 may occur when the place to which the lighting apparatus 1 is attached vibrates. With regard to this point, as described above, in the configuration in which the lighting apparatus 1 is provided with the biasing unit 49-1, and in which the biasing unit 49-1 applies a biasing force to the idle gear 48 in the axial direction, the force for mechanically maintaining the position can be enhanced by ensuring a sliding resistance between the idle gear 48 and the first base plate 45, and by maintaining the position where the gear 472 mounted on the output rotational axis 471 of the first motor 47 is enmeshed with the large-diameter gear 473. This configuration is also advantageous in that rattling of the gears pivoting about the first rotational axis can be suppressed, and therefore, the noise generated by the pivoting operation can be also suppressed.

As described above, with the configuration in which the biasing unit 49-1 applies a biasing force to the idle gear 48-1 that is provided outside of the path via which the driving power of the first motor 47 is communicated, as the target gear, the communication of the driving power is affected less, advantageously, compared with a configuration in which the biasing force is applied to a gear in the path via which the driving power is communicated. From the viewpoint of suppressing the inconvenience caused by the self-weight of the operation target (the lighting apparatus 1), it is also possible to make a preferable use of a configuration in which the biasing unit 49-1 applies the biasing force to a gear in the path via which the driving power is communicated, as the target gear. Also with such a configuration in which the biasing unit 49-1 applies the biasing force to a gear in the path via which the driving power is communicated as the target gear, the force for mechanically maintaining the position can be enhanced, and the inconvenience caused by the self-weight of the operation target can be suppressed, advantageously.

Furthermore, in a configuration in which the biasing unit 49 has a shape with the pair of arms 495, 495, and the pair of arms 495, 495 are brought into abutment against the outer circumferential edge of the flange 482 so that the biasing force is applied to the idle gear 48 in a manner distributed to two points, for example, a smaller biasing force to the idle gear 48 is required, compared with a configuration in which the biasing force is applied at the center of the flange 482 (a configuration in which the biasing force is applied at one point). Furthermore, in a configuration in which the biasing force is applied in a manner distributed to two points, the biasing force can be applied reliably, even when the biasing force is not evenly applied to the two points. It is also possible for the biasing unit 49-1 to be attached directly to the arm 20, without limitation to being attached to the first base plate 45.

Figure 2:
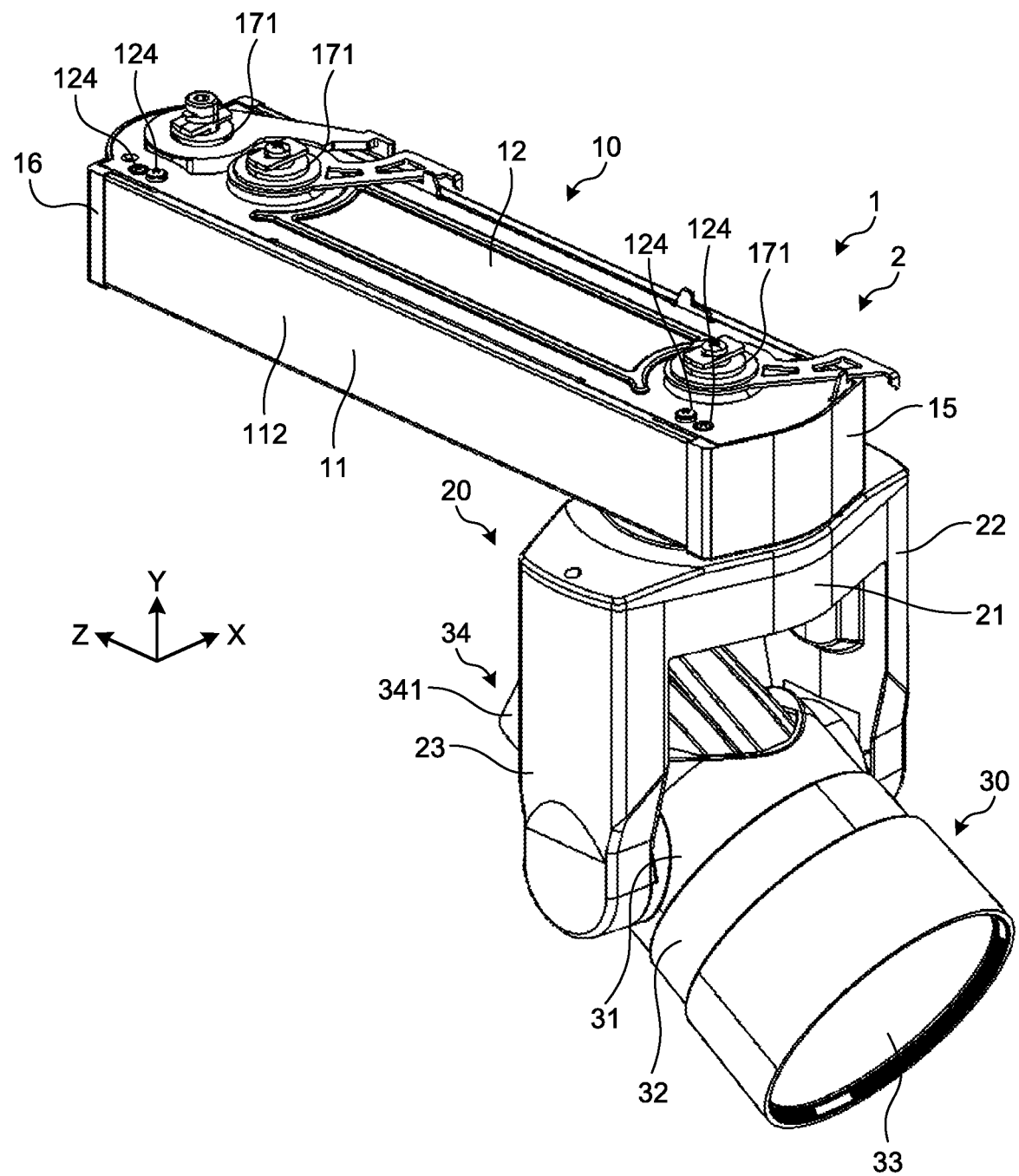
FIG. 2 is a perspective view illustrating the lighting apparatus according to the embodiment.
Figure 3:
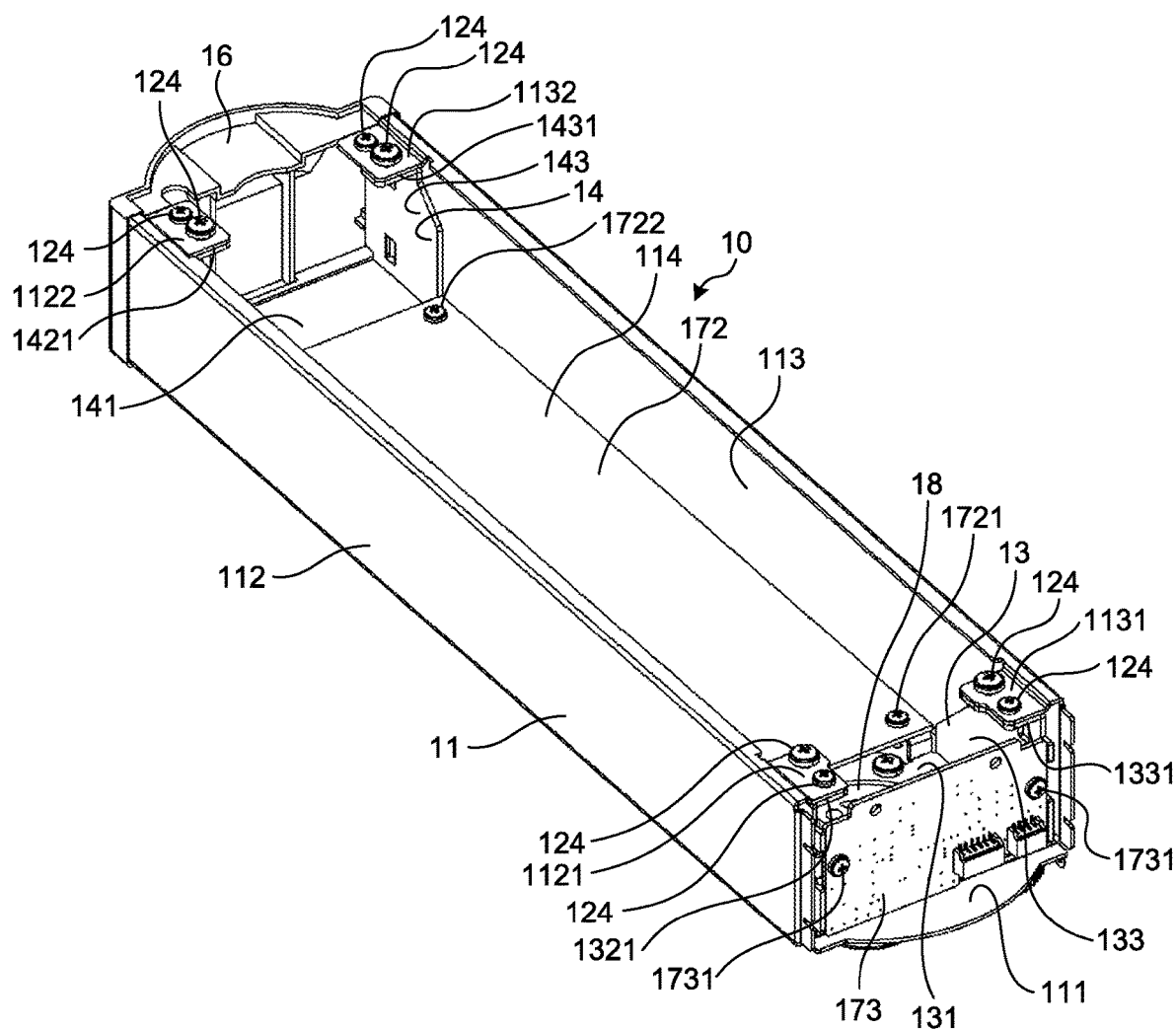
FIG. 3 is a perspective view illustrating inside of a housing box in the lighting apparatus according to the embodiment.

As illustrated in FIGS. 1 and 2, a first arm portion 22 and a second arm portion 23 are continuous to the coupling portion 21 of the arm 20. For example, the first arm portion 22 and the second arm portion 23 are continuous to the respective ends of the coupling portion 21 of the arm 20 (the respective ends in the right-and-left direction in FIG. 1). The arm 20 also holds the lamp head 30 between the first arm portion 22 and the second arm portion 23. Specifically, the arm 20 keeps the lamp head 30 rotatably about the second rotational axis, between a tip end of the first arm portion 22 and a tip end of the second arm portion 23. The arm 20 may have only the first arm portion 22, without the second arm portion 23, and the first arm portion 22 may hold the lamp head 30 rotatably about the second rotational axis. Furthermore, in the lighting apparatus 1, because the mechanism for pivoting the lamp head 30 is provided inside of the first arm portion 22, a configuration inside of the first arm portion 22 will be explained in detail below. Furthermore, the side of the arm 20 connected to the coupling portion 21 will be sometimes referred to as one end of the arm 20, and the tip end side of the first arm portion 22 of the arm 20 will be sometimes referred to as the other end.

Figure 14:
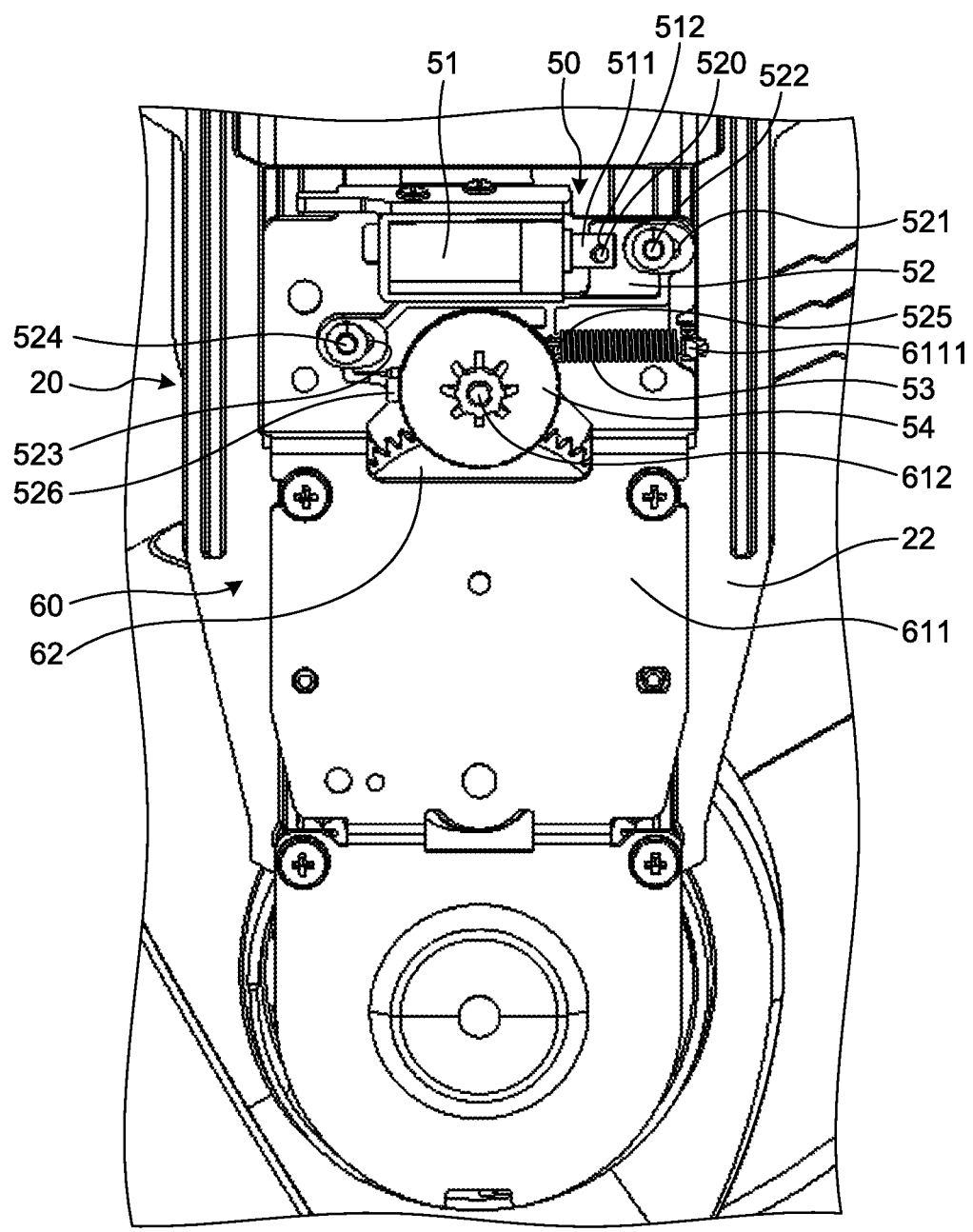
FIG. 14 is a front view illustrating inside of a second arm portion in the lighting apparatus according to the embodiment.
Figure 15:
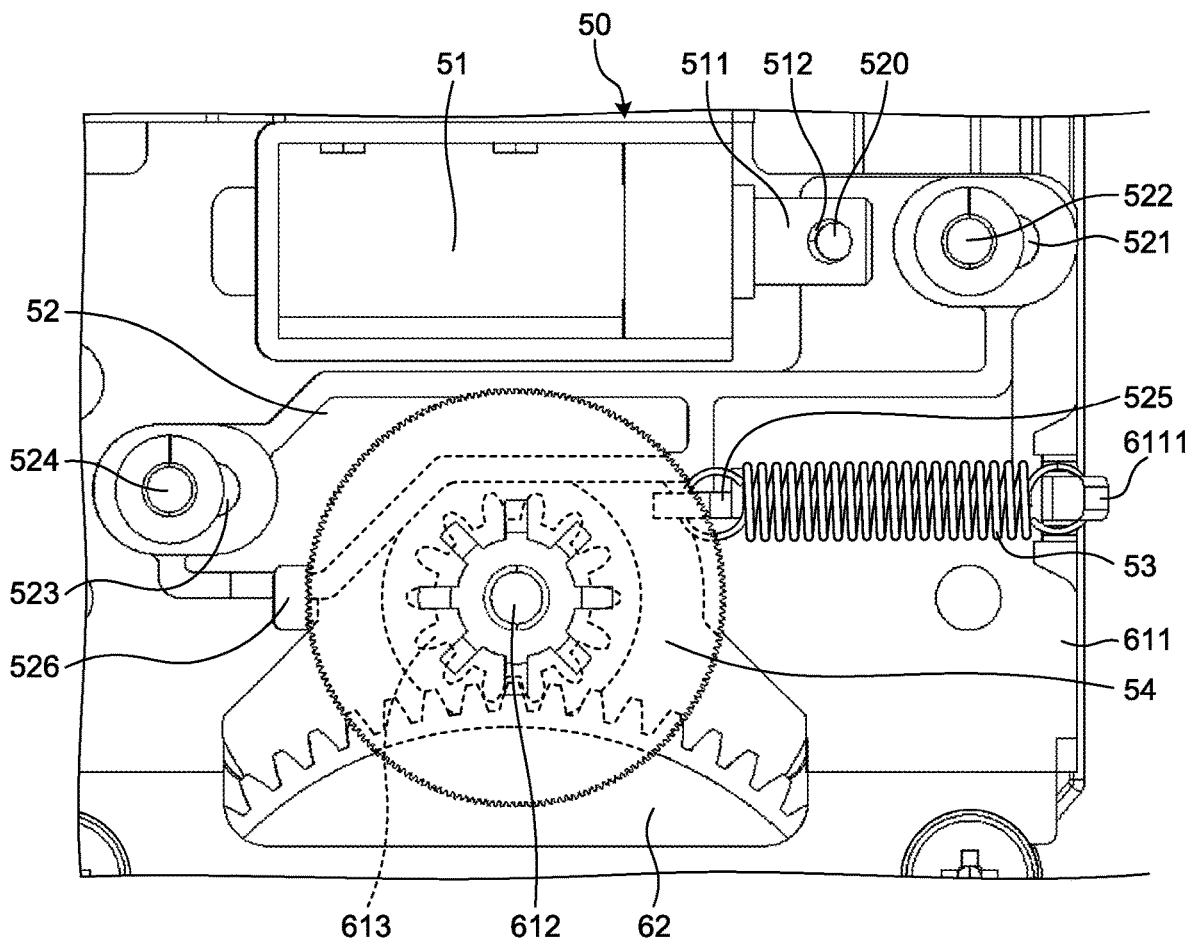
FIG. 15 is a plan view illustrating a brake unit in the lighting apparatus according to the embodiment.
Figure 16:
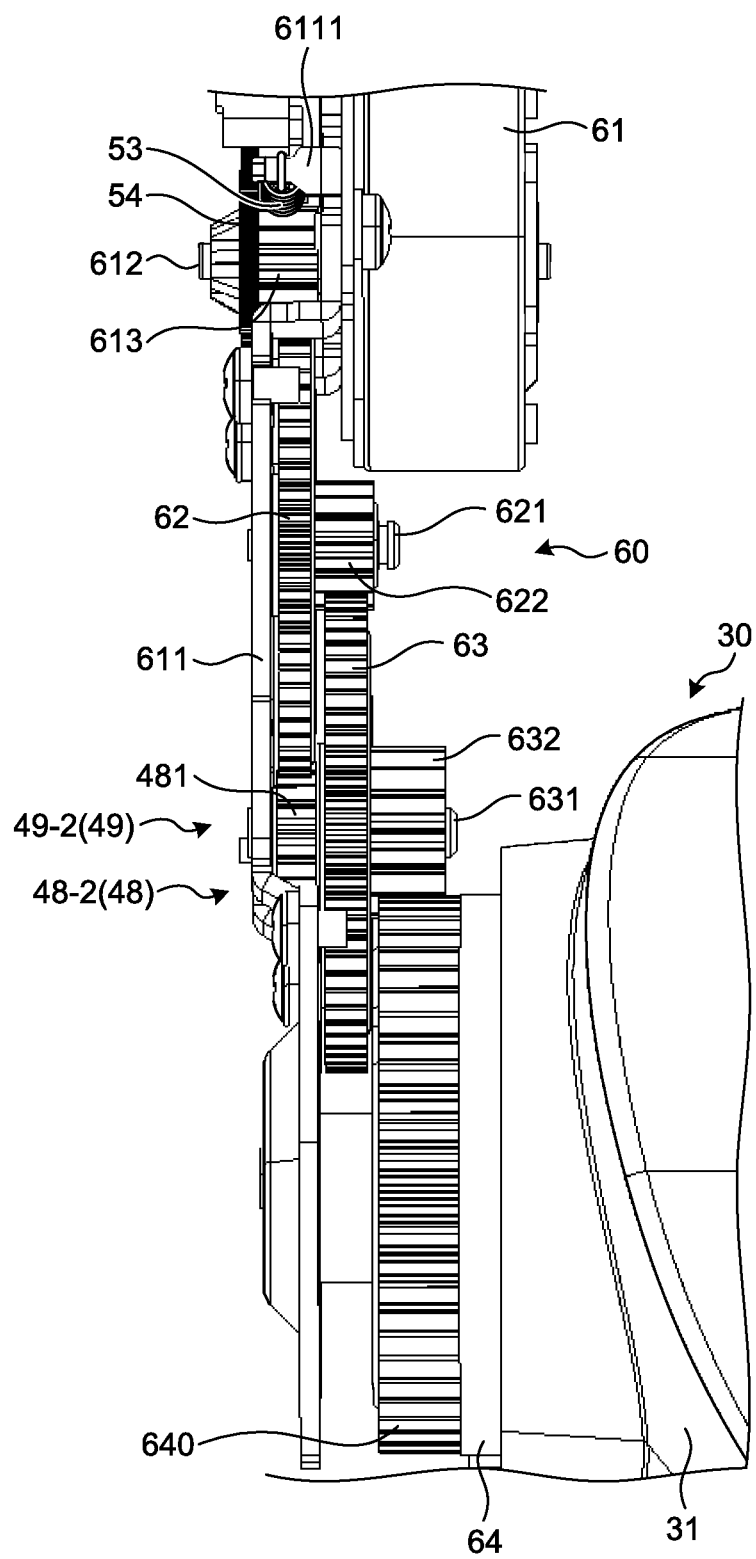
FIG. 16 is a side view illustrating a principal part inside of the second arm portion in the lighting apparatus according to the embodiment.
Figure 17:
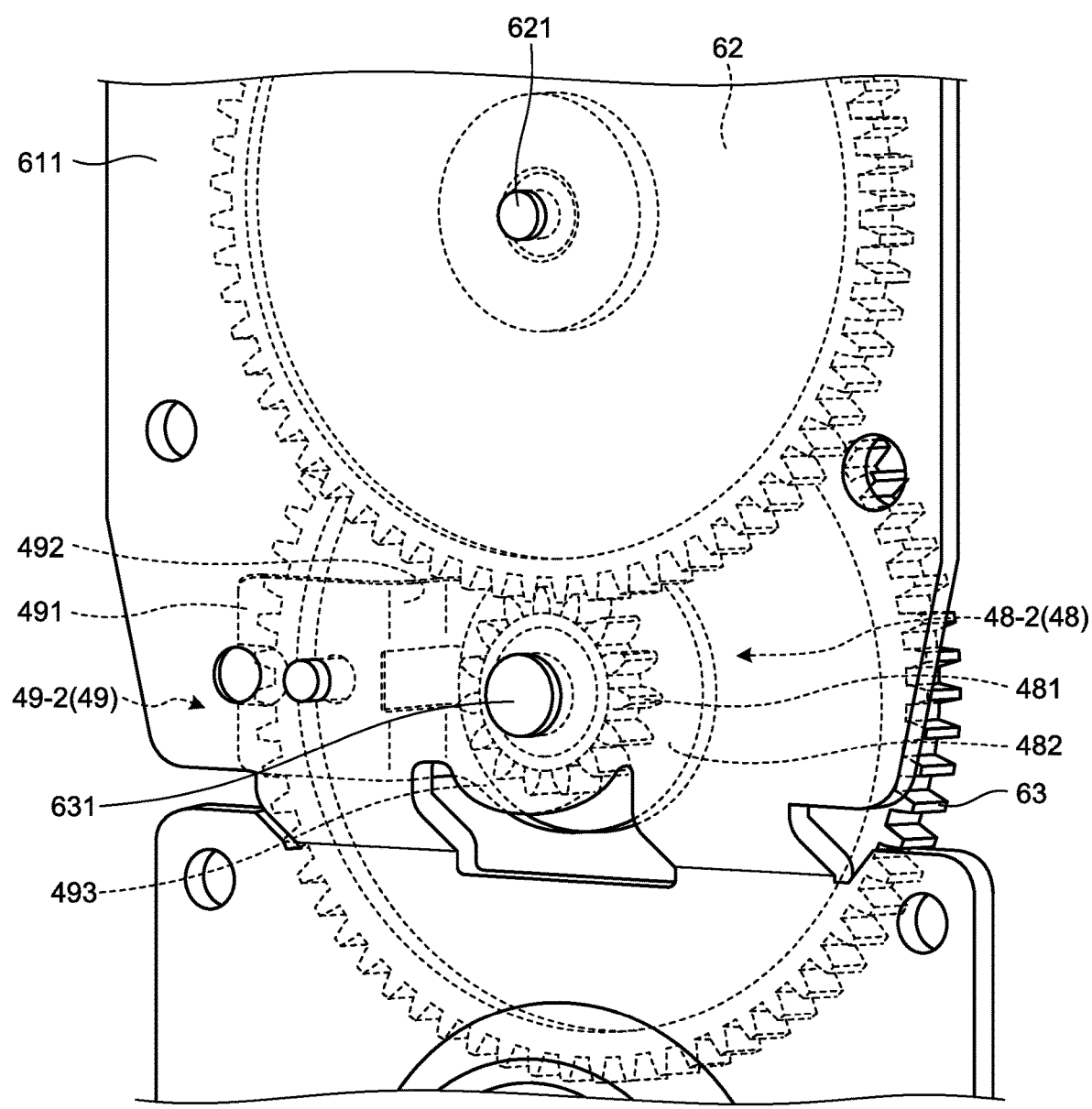
FIG. 17 is a perspective view illustrating a relation between the biasing unit and the target gear in the lighting apparatus according to the embodiment.
Figure 18:
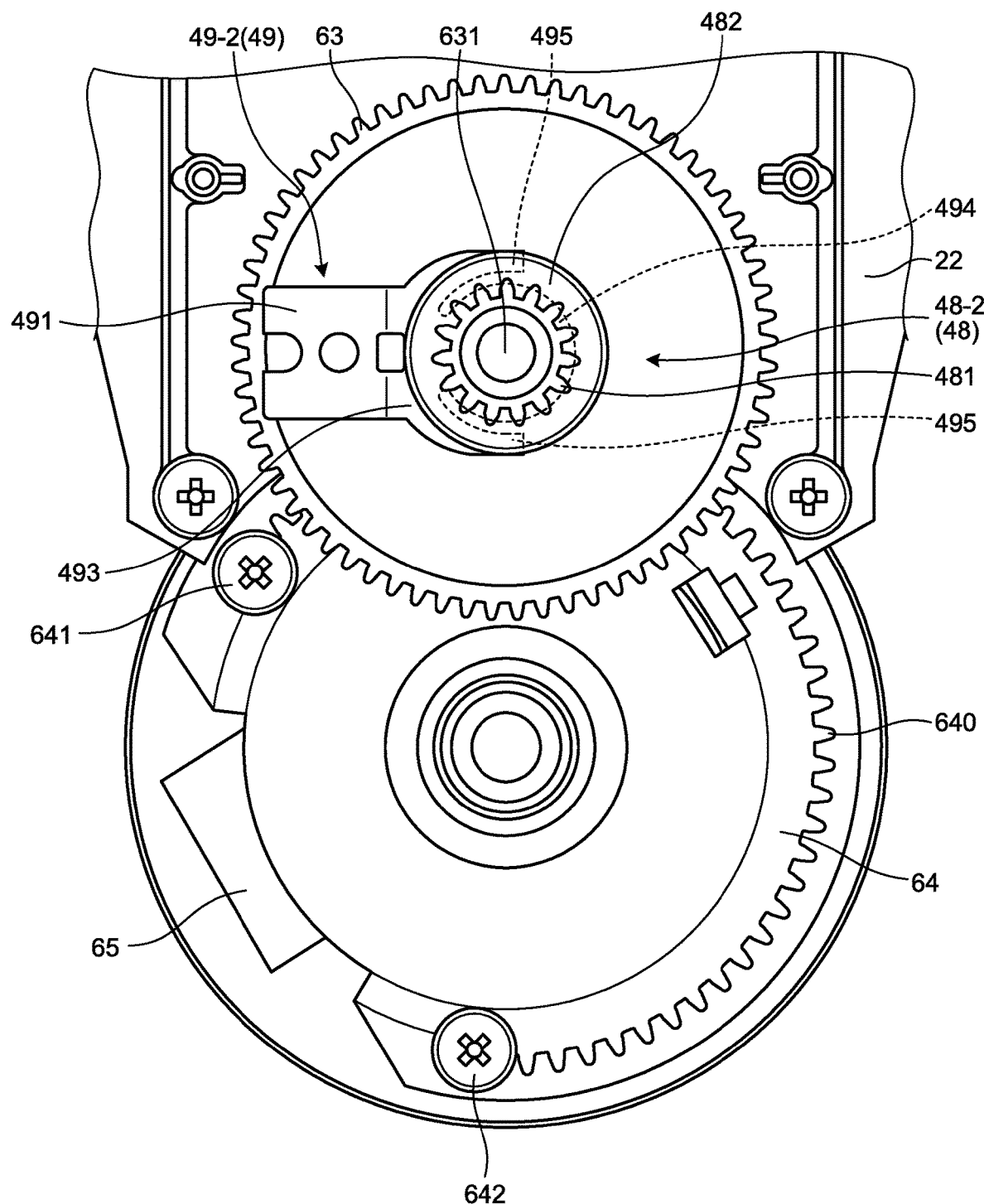
FIG. 18 is a perspective view illustrating a principal part inside of the second arm portion in the lighting apparatus according to the embodiment.

A configuration inside the first arm portion 22 of the arm 20 will now be explained with reference to FIGS. 14 to 18. FIG. 14 is a front view illustrating inside of the second arm portion in the lighting apparatus according to the embodiment. FIG. 15 is a plan view illustrating a brake unit in the lighting apparatus according to the embodiment. Specifically, FIG. 15 is a front view illustrating a principal part of a brake unit 50, with a braking gear 54 represented as transparent. FIG. 16 is a side view illustrating a principal part inside of the second arm portion in the lighting apparatus according to the embodiment. FIG. 17 is a perspective view illustrating a relation between the biasing unit and the target gear in the lighting apparatus according to the embodiment. Specifically, FIG. 17 is a front view illustrating a principal part of a second pivoting portion 60, with a second base plate 611 represented as transparent. FIG. 18 is a perspective view illustrating a principal part inside of the second arm portion in the lighting apparatus according to the embodiment. Specifically, FIG. 18 is a front view illustrating a principal part of the second pivoting portion 60, with the idle gear 48 represented as transparent.

As illustrated in FIG. 14, the brake unit 50 and the second pivoting portion 60 are disposed inside the first arm portion 22. As illustrated in FIG. 16, the second pivoting portion 60 includes a second motor 61 serving as a second driving source. For example, a stepping motor is used as the second motor 61. The second motor 61 is attached to a second base plate 611. A gear 613 is mounted on an output rotational axis 612 of the second motor 61. As illustrated in FIG. 14, the second base plate 611 is disposed inside of the first arm portion 22, and is attached to the arm 20 with screws, for example.

Furthermore, as illustrated in FIGS. 15 and 16, the gear 613 mounted on the output rotational axis 612 of the second motor 61 is enmeshed with a large-diameter gear 62. On a rotational axis 621 to which the large-diameter gear 62 is attached, a small-diameter gear 622 is mounted. In other words, the large-diameter gear 62 and the small-diameter gear 622 rotate about the rotational axis 621. The large-diameter gear 62 and the small-diameter gear 622 may be integrally formed.

The small-diameter gear 622 is enmeshed with a large-diameter gear 63. On a rotational axis 631 to which the large-diameter gear 63 is attached, a small-diameter gear 632 is mounted. In other words, the large-diameter gear 63 and the small-diameter gear 632 rotate about the rotational axis 631. The large-diameter gear 63 and the small-diameter gear 632 may be integrally formed.

The small-diameter gear 632 is enmeshed with outer teeth 640 that are provided on the outer circumference of an attachment gear portion 64. For example, the attachment gear portion 64 is made of a resin material. As illustrated in FIG. 18, the attachment gear portion 64 is attached to a housing unit 31 of the lamp head 30 with screw members 641, 642, and the lamp head 30 is rotated as the attachment gear portion 64 is rotated. With this configuration, the lamp head 30 pivots about the second rotational axis, in response to the output of the second motor 61.

Furthermore, as illustrated in FIG. 17, on the rotational axis 631 to which the large-diameter gear 63 is attached, the idle gear 48-2 that is a target gear is mounted. For example, the idle gear 48-2 is mounted between the large-diameter gear 63 and the second base plate 611. The tip end of the rotational axis 631 on which the idle gear 48-2 is mounted is passed through an insertion hole provided to the second base plate 611. As described earlier, the idle gear 48-2 has the gear portion 481 and the flange 482. For example, the idle gear 48-2 is disposed in such a manner that the flange 482 faces the large-diameter gear 63, and the gear portion 481 faces the second base plate 611. Damper grease is provided between the idle gear 48-2 and the rotational axis 631. With the damper grease, viscous resistance can be generated between the idle gear 48-2 and the rotational axis 631.

As illustrated in FIG. 16, the gear portion 481 of the idle gear 48-2 is enmeshed with the large-diameter gear 63. In this manner, the idle gear 48-2 is enmeshed with the large-diameter gear 63 that is a gear in a communication path for communicating the driving power from the second motor 61 to the lamp head 30 that is the operation target. In other words, the idle gear 48-2 is enmeshed with the large-diameter gear 63 forming a communication path for communicating the driving power from the second motor 61 to the attachment gear portion 64 that is attached to the lamp head 30.

Furthermore, as illustrated in FIG. 17, the biasing unit 49-2 for applying a biasing force to the idle gear 48-2 in the axial direction of the idle gear 48-2 is attached to the second base plate 611. With this structure, the biasing unit 49-2 is attached to the arm 20.

As illustrated in FIGS. 17 and 18, the biasing unit 49-2 applies a biasing force to the idle gear 48-2 in the axial direction so that a pair of arms 495, 495 press the idle gear 48-2 against the second base plate 611.

As described above, in the configuration in which the lighting apparatus 1 is provided with the biasing unit 49-2, and the biasing unit 49-2 applies a biasing force to the idle gear 48-2 in the axial direction, because a sliding resistance is generated between the idle gear 48-2 and the second base plate 611, the idle gear 48-2 rotates less easily, and, therefore, it is possible to generate a mechanical holding force. As described earlier, in a configuration in which a stepping motor is used as the second motor 61, because the position of the rotor is controlled by the magnetic field when the power is supplied thereto, the position where the gear 613 mounted on the output rotational axis 612 of the second motor 61 is enmeshed with the large-diameter gear 62 is maintained. When the power supply stops (with no generation of the magnetic field), the force for mechanically maintaining the position may weaken, compared with when the power is being supplied. With regard to this point, as described above, in the configuration in which the lighting apparatus 1 is provided with the biasing unit 49-2, and in which the biasing unit 49-2 applies a biasing force to the idle gear 48-2 in the axial direction, the force for mechanically maintaining the position can be enhanced by ensuring a sliding resistance between the idle gear 48-2 and the second base plate 611, and by maintaining the position where the gear 613 mounted on the output rotational axis 612 of the second motor 61 is enmeshed with the large-diameter gear 62. The configuration described above is also advantageous in that rattling of the gears pivoting about the second rotational axis can be suppressed, and the noise generated by the pivoting operation can be also suppressed.

As described above, with the configuration in which the biasing unit 49-2 applies a biasing force to the idle gear 48-2 that is provided outside of the path via which the driving power of the second motor 61 is communicated, as the target gear, the communication of the driving power is affected less, advantageously, compared with a configuration in which the biasing force is applied to a gear in the path via which the driving power is communicated. From the viewpoint of suppressing the inconvenience caused by the self-weight of the operation target (the lighting apparatus 1), it is also possible to make a preferable use of a configuration in which the biasing unit 49-2 applies the biasing force to a gear in the path via which the driving power is communicated, as the target gear. Also with such a configuration in which the biasing unit 49-2 applies the biasing force to a gear in the path via which the driving power is communicated as the target gear, the force for mechanically maintaining the position can be enhanced, and the inconvenience caused by the self-weight of the operation target can be suppressed, advantageously.

It is also possible for the biasing unit 49-2 to be attached directly to the arm 20, without limitation to being attached to the second base plate 611. Furthermore, the target gear to which the biasing unit 49-2 applies a biasing force may be another gear, without limitation to the idle gear 48-2.

The brake unit 50 will now be explained. As illustrated in FIG. 15, the brake unit 50 includes a keep solenoid 51 and a stopper member 52. For example, the brake unit 50 is disposed on the second base plate 611, on the rear side of the side on which the second motor 61 is provided. On the rear side of the second base plate 611, a spring member 53, and a braking gear 54 that is target gear are provided. One end of the spring member 53 is hooked onto a hook 6111 provided to the second base plate 611. The braking gear 54 is mounted on the output rotational axis 612 of the second motor 61. The braking gear 54 is disposed inside of the arm 20, and is rotated as the lamp head 30 is pivoted. The target gear that is the target of the brake unit 50 may be any other gear, without limitation to the braking gear 54.

The keep solenoid 51 is attached to the second base plate 611, and retracts and advances a shaft portion 511 when the power is supplied. The advancement/retraction direction in which the shaft portion 511 is retracted and advanced is illustrated as a right-and-left direction in FIG. 15. Specifically, when the power supply stops, the keep solenoid 51 advances the shaft portion 511 in the advancement/retraction direction, to the position illustrated in FIG. 15. When the power is supplied, the keep solenoid 51 retracts the shaft portion 511 in the advancement/retraction direction so that the tip end of the shaft portion 511 moves to the left with respect to the position illustrated in FIG. 15. In the explanation below, the position of the shaft portion 511 without any power supply will be referred to as a first position of the shaft portion 511, and the position of the shaft portion 511 with the power supply will be referred to as a second position of the shaft portion 511.

The stopper member 52 includes a projection 520, inserted portions 521, 523, restricting members 522, 524, a hook 525, and a receiving unit 526. The inserted portions 521, 523 of the stopper member 52 have a shape elongated in the longitudinal direction along the advancement/retraction direction of the shaft portion 511. The restricting members 522, 524 of the stopper member 52 are passed through the inserted portions 521, 523, respectively, and are attached to the second base plate 611. The inserted portions 521, 523 are moveable with respect to the restricting members 522, 524, respectively, in the advancement/retraction direction of the shaft portion 511. With this configuration, the stopper member 52 is attached to the second base plate 611 in a movable manner in the advancement/retraction direction of the shaft portion 511.

The projection 520 of the stopper member 52 is passed through a stopping hole 512 of the shaft portion 511, and is moved in the advancement/retraction direction of the shaft portion 511 as the shaft portion 511 is advanced and retracted. With this configuration, the stopper member 52 is moved in the advancement/retraction direction of the shaft portion 511, as the shaft portion 511 is advanced and retracted. In the explanation hereunder, the position where the stopper member 52 is when the shaft portion 511 is at the first position of the shaft portion 511 will be referred to as a first position of the stopper member 52, and the position where the stopper member 52 is when the shaft portion 511 is at the second position will be referred to as a second position of the stopper member 52.

The other end of the spring member 53, the other end being on the opposite side of the one end hooked onto the hook 6111 of the second base plate 611, is hooked onto the hook 525 of the stopper member 52. With this configuration, the spring member 53 applies a biasing force to the stopper member 52 in the direction in which the shaft portion 511 is advanced. In FIG. 15, the spring member 53 applies a biasing force to the stopper member 52 toward the right.

A gear is provided to the receiving unit 526 of the stopper member 52, and the gear is enmeshed (brought into contact) with the braking gear 54 when the stopper member 52 is at the first position. The number of the teeth provided to the braking gear 54 is greater than twice the number of poles included in the second motor 61. With this configuration, it is possible to prevent the gear position and the pulse from being offset from each other, between before the power supply is stopped and after the power supply is restarted. For example, the braking gear 54 is configured to have teeth four times the number of poles included in the second motor 61.

In a configuration in which a stepping motor is used as the second motor 61, because the position of the rotor is controlled by the magnetic field when the power is supplied thereto, the position at which the gear 613 mounted on the output rotational axis 612 of the second motor 61 is enmeshed with the large-diameter gear 62 is maintained, and therefore, it is possible to increase the force for maintaining the angle about the second rotational axis to a desired angle. When the power supply stops (with no generation of the magnetic field), the force for mechanically maintaining the position may weaken, compared with when the power is being supplied. If the force for mechanically maintaining the position weakens, the orientation of the lighting apparatus 1 may become inclined toward the center of gravity of the lamp head 30, and the stability of the operation of the lighting apparatus 1 becomes a concern. Such an inconvenience due to the self-weight of the lighting apparatus 1 may occur when the place to which the lighting apparatus 1 is attached vibrates. With regard to this point, as described above, in a configuration in which the spring member 53 applies a biasing force to the stopper member 52 toward the right, the receiving unit 526 is biased toward the braking gear 54 when the power supply stops, and keeps the position at which the gear 613 mounted on the output rotational axis 612 of the second motor 61 is enmeshed with the large-diameter gear 62. Therefore, it is possible to increase the force for maintaining the angle about the second rotational axis to a desired angle. Furthermore, as the power is supplied and the shaft portion 511 is retracted, the stopper member 52 is moved to the second position of the stopper member 52, and releases the mesh (contact) between the receiving unit 526 and the braking gear 54. Therefore, it is possible to suppress the brake unit 50 from preventing the lamp head 30 to pivot about the second rotational axis.

A configuration and pivoting of the lamp head 30 will now be explained. As illustrated in FIGS. 1 and 2, the lamp head 30 includes a housing unit 31, a holder unit 32, a cover unit 33, and a heat radiator unit 34. The lamp head 30 includes, for example, a light-emitting diode (LED) disposed on the substrate 100, as a light source the orientation of which is to be changed. In other words, the lamp head 30 is a lamp head capable of changing the direction in which the light is emitted.

Figure 19:
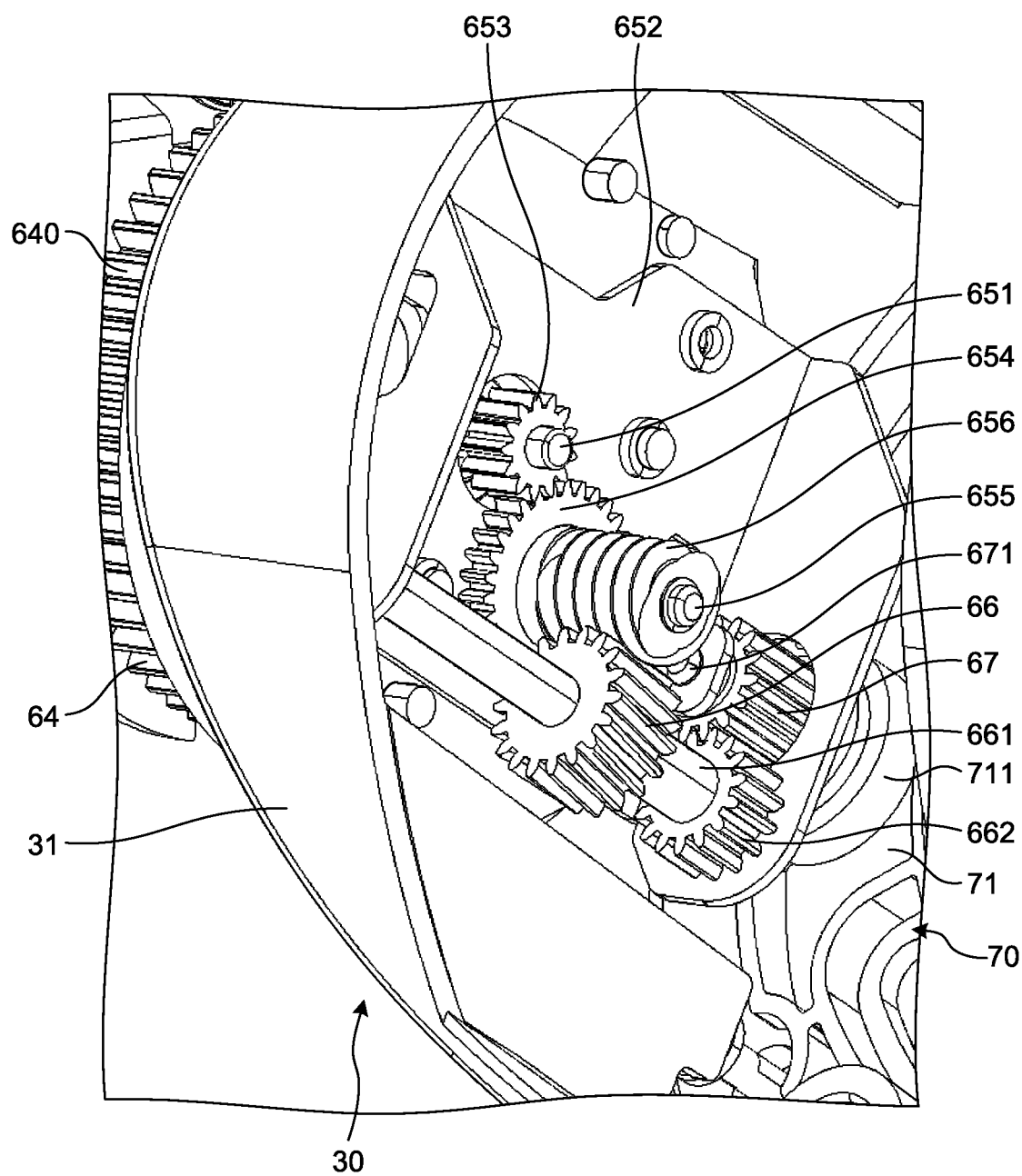
FIG. 19 is a perspective view illustrating a principal part of a driving mechanism using a third motor in the lighting apparatus according to the embodiment.

As illustrated in FIG. 18, a third motor 65 is disposed inside of the attachment gear portion 64. In this manner, the third motor 65 is disposed inside the first arm portion 22 of the arm 20. Furthermore, as illustrated in FIG. 19, an output rotational axis 651 of the third motor 65 projects out inside of the housing unit 31 of the lamp head 30. FIG. 19 is a perspective view illustrating a principal part of the driving mechanism using the third motor in the lighting apparatus according to the embodiment. The output rotational axis 651 of the third motor 65 is passed through an insertion hole provided to a third base plate 652 positioned inside of the housing unit 31 that is coupled to the first arm portion 22, and projects out inside of the housing unit 31.

A gear 653 mounted on the output rotational axis 651 of the third motor 65 is enmeshed with a large-diameter gear 654. On a rotational axis 655 to which the large-diameter gear 654 is attached, a worm gear 656 is mounted. In other words, the large-diameter gear 654 and the worm gear 656 rotate about the rotational axis 655. The large-diameter gear 654 and the worm gear 656 may be integrally formed.

The worm gear 656 is enmeshed with a worm wheel 66. On a rotational axis 661 to which the worm wheel 66 is attached, a gear 662 is mounted. In other words, the worm wheel 66 and the gear 662 rotate about the rotational axis 661.

The gear 662 is enmeshed with one end side of a gear 67. The gear 67 is mounted on a rotational axis 671, and the other end thereof is passed through an insertion hole 711 provided to a rotation restricting unit 70 and into a reflecting unit 90.

Figure 20:
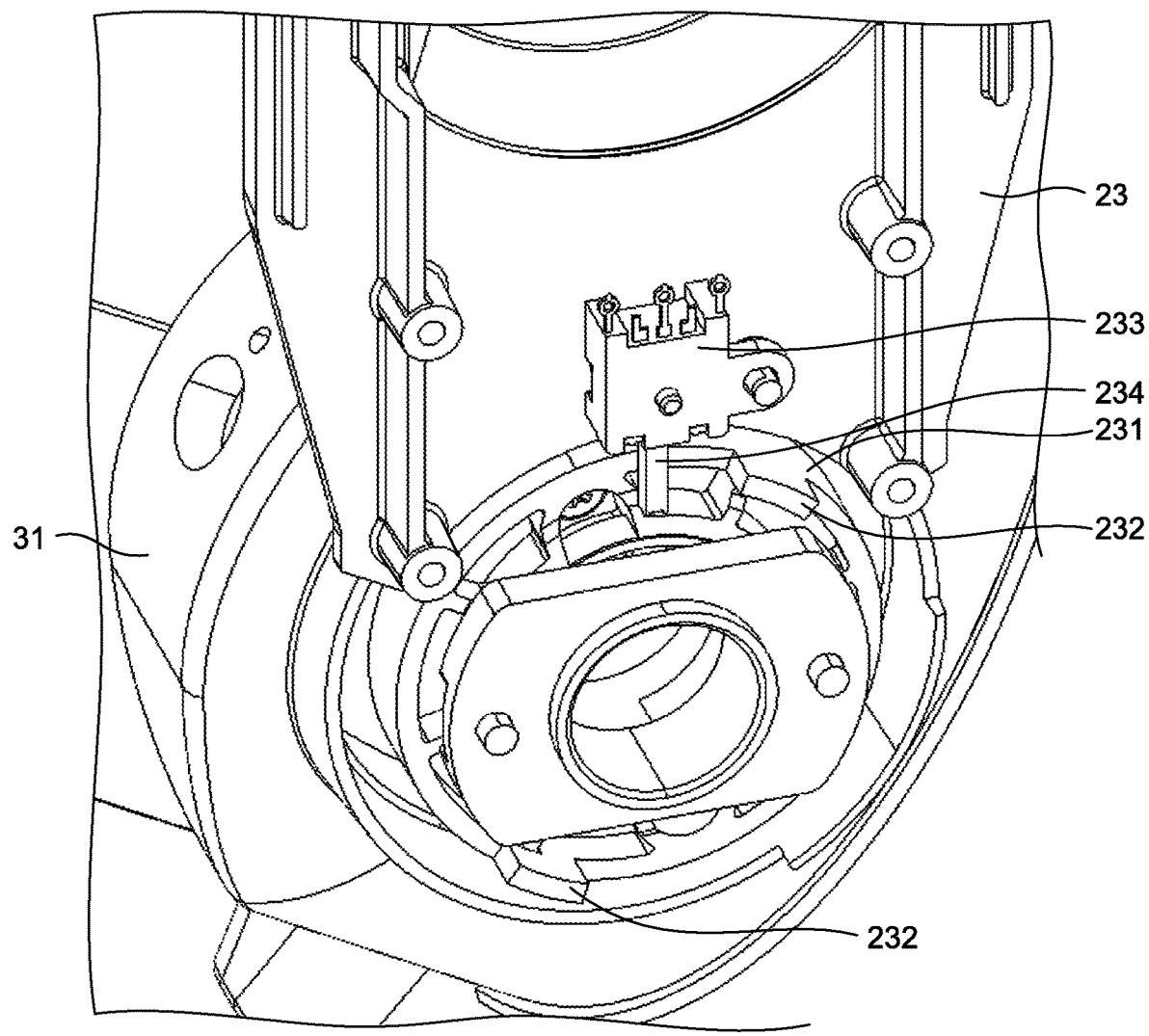
FIG. 20 is a perspective view illustrating a principal part of a second arm portion in the lighting apparatus according to the embodiment.

Furthermore, as illustrated in FIG. 20, the second arm portion 23 is coupled to the housing unit 31 of the lamp head 30, on the opposite side of the part where the first arm portion 22 is coupled to the housing unit 31. FIG. 20 is a perspective view illustrating a principal part of the second arm portion in the lighting apparatus according to the embodiment.

To the part where the second arm portion 23 is coupled to the housing unit 31, a coupling member 231 having a cylindrical shape is provided. The coupling member 231 has a pair of projecting portions 232, 232 projecting toward the second arm portion 23. Inside of the second arm portion 23, a third switch 233 is provided at a position following the outer circumference of the coupling member 231. For example, the third switch 233 is provided with a lever 234 projecting toward the coupling member 231, along the plane of the coupling member 231. For example, the lever 234 of the third switch 233 is provided in a manner projecting to the position overlapping with the projecting portions 232, 232 of the coupling member 231, in the circumferential direction of the coupling member 231. As the lever 234 of the third switch 233 is pivoted by the projecting portions 232, 232 of the coupling member 231, the limits defining a specified rotational angle are detected, and the detections are used in the motor control, e.g., to stop the operation of the first motor 47. With the third switch 233 and the projecting portions 232, 232 of the coupling member 231, the first base plate 45, that is, the arm 20 defines the rotational angle of the lamp head 30 about the second rotational axis to a range of substantially 180 degrees, for example.

Figure 21:
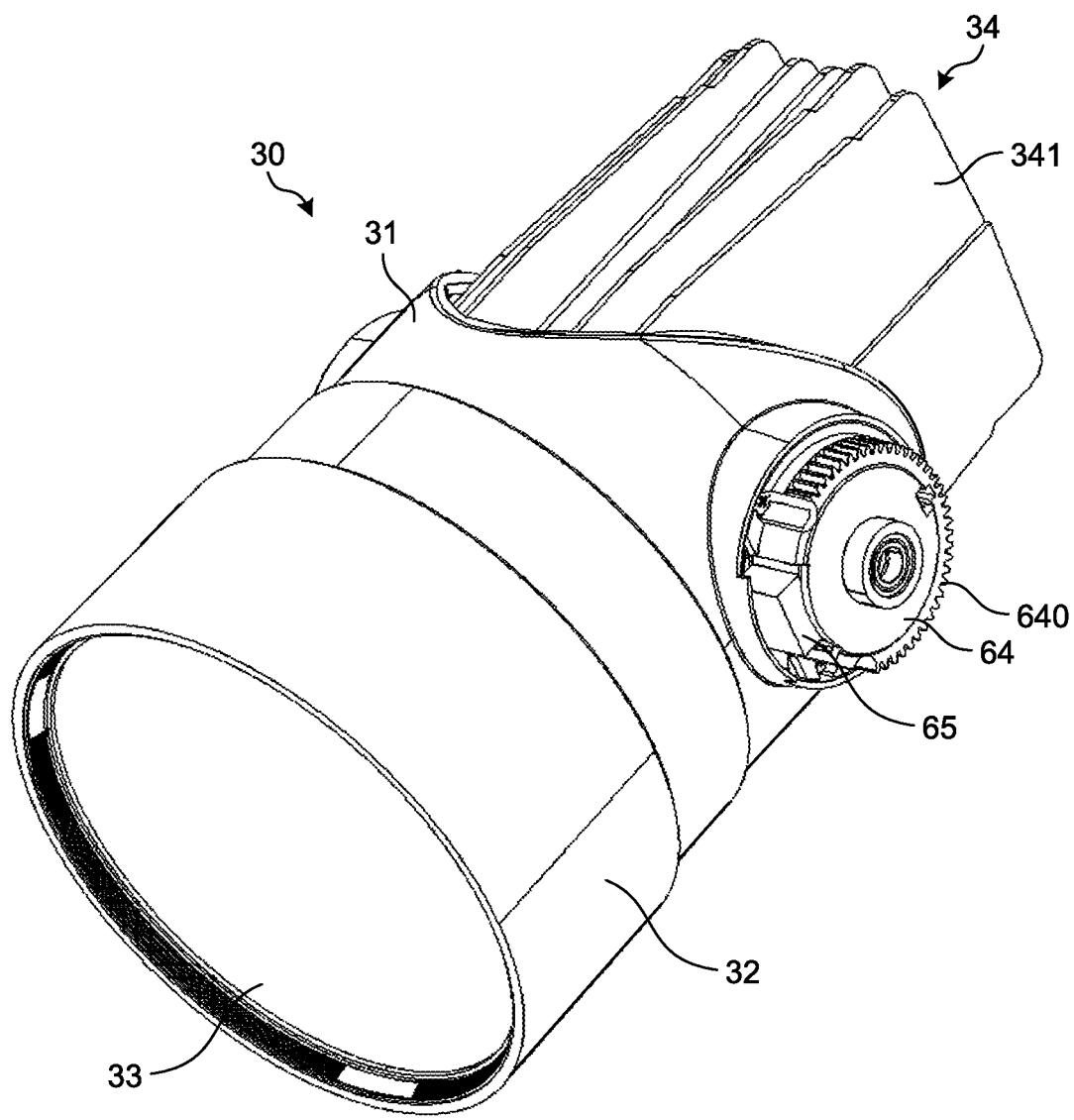
FIG. 21 is a perspective view illustrating a lamp head in the lighting apparatus according to the embodiment.

A configuration of the lamp head 30 will now be explained with reference to FIG. 21. FIG. 21 is a perspective view illustrating the lamp head in the lighting apparatus according to the embodiment. As illustrated in FIG. 21, the heat radiator unit 34 includes a plurality of heat radiator fins 341, and is attached to the substrate 100 on the opposite side of the surface from which the light is emitted. In the example illustrated in FIG. 21, the heat radiator unit 34 is attached to the holder unit 32 using an attaching mechanism such as screwing. Explained above is merely an example, and the attaching mechanism for attaching the heat radiator unit 34 to the holder unit 32 may be any attaching mechanism.

Figure 22:
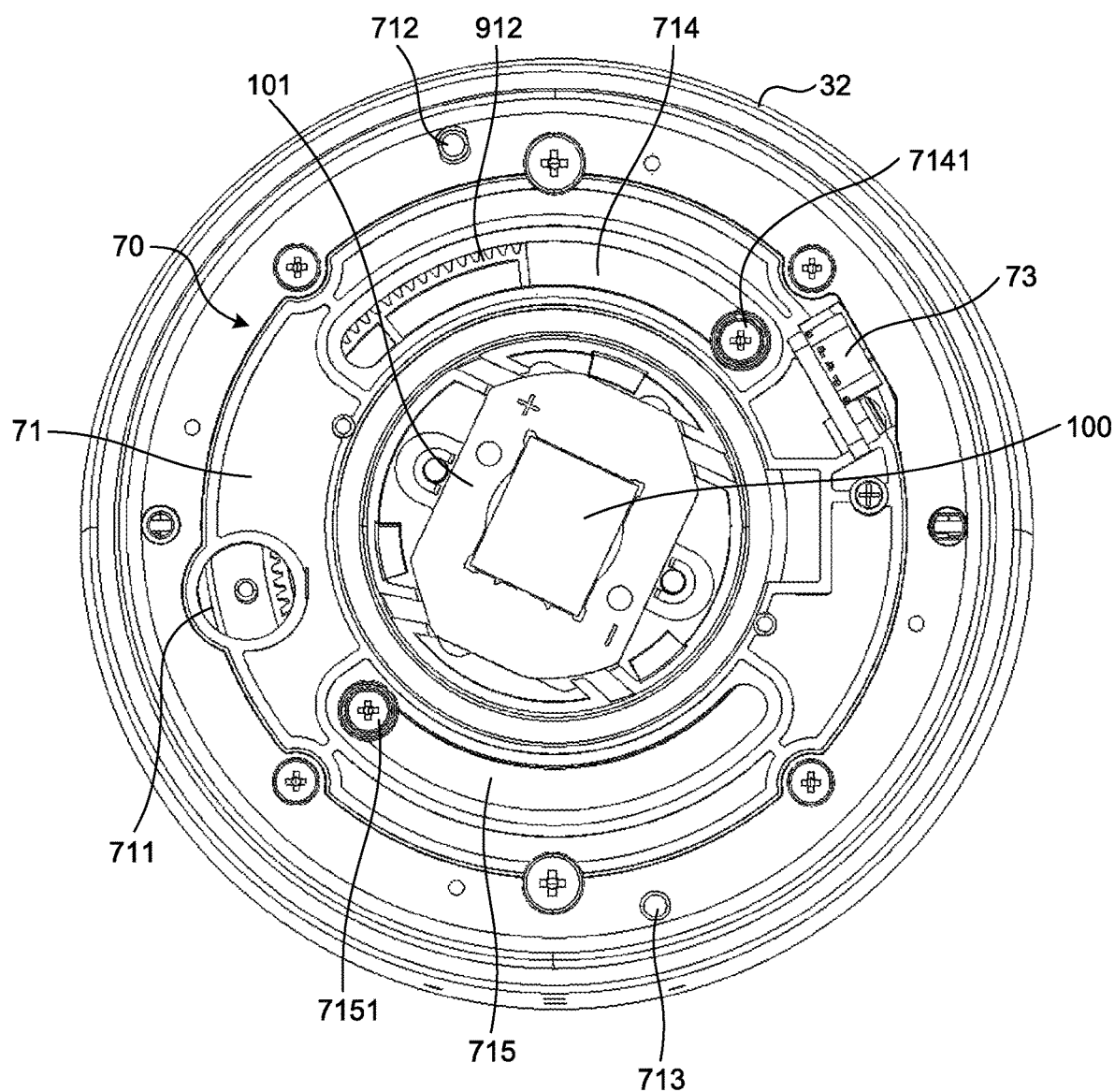
FIG. 22 is a plan view illustrating a principal part of the lamp head in the lighting apparatus according to the embodiment.
Figure 23:
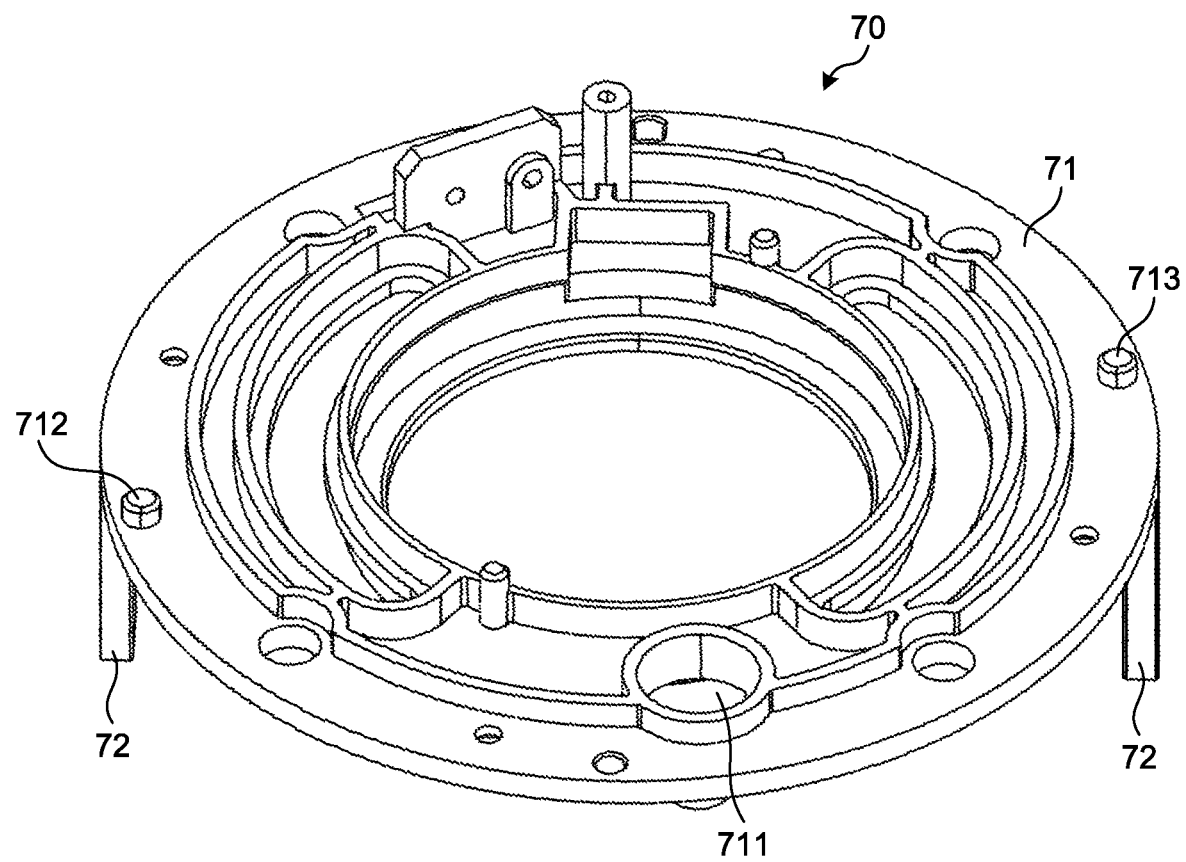
FIG. 23 is a perspective view illustrating a rotation restricting unit in the lighting apparatus according to the embodiment.
Figure 24:
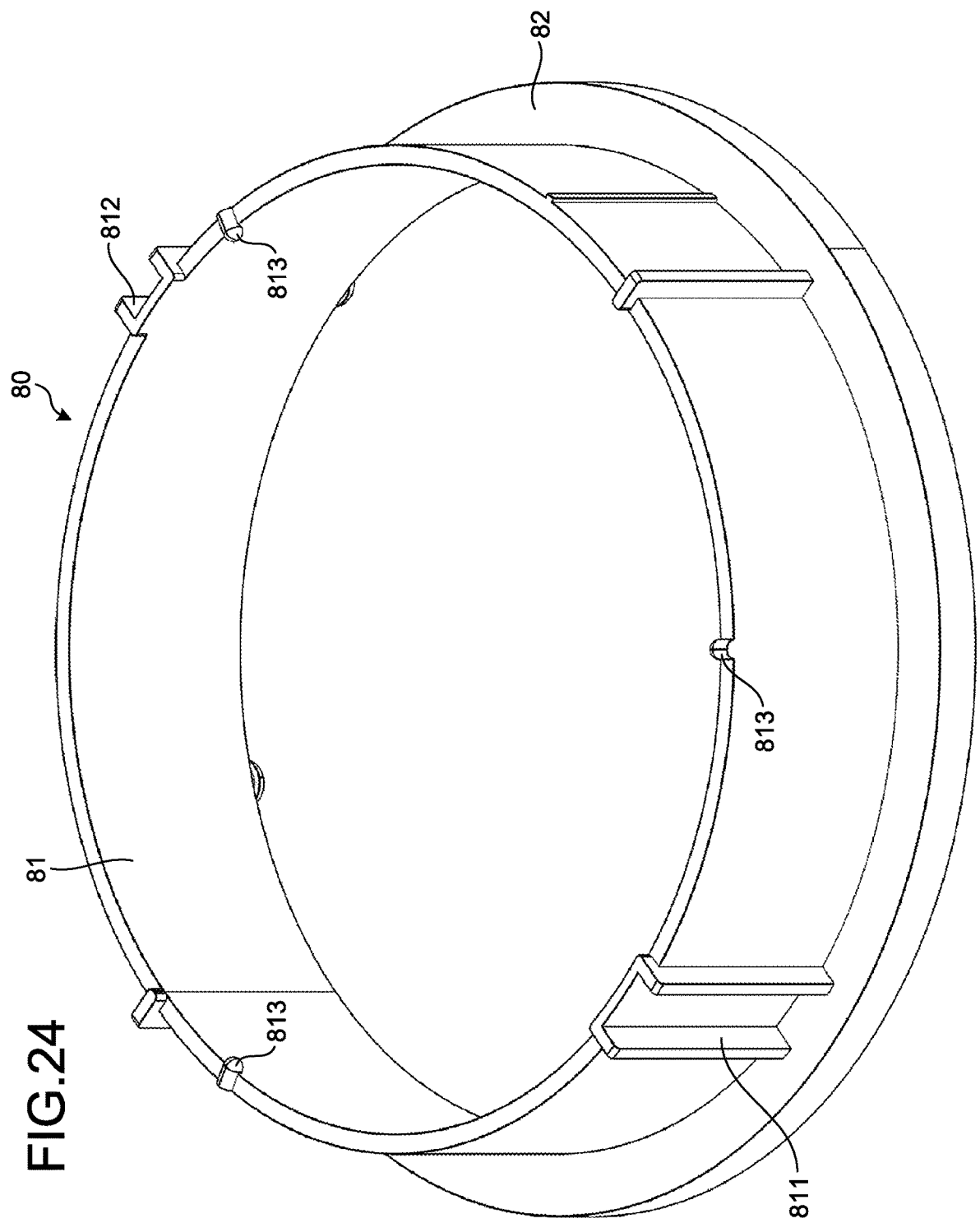
FIG. 24 is a perspective view illustrating an aiming unit in the lighting apparatus according to the embodiment.
Figure 25:
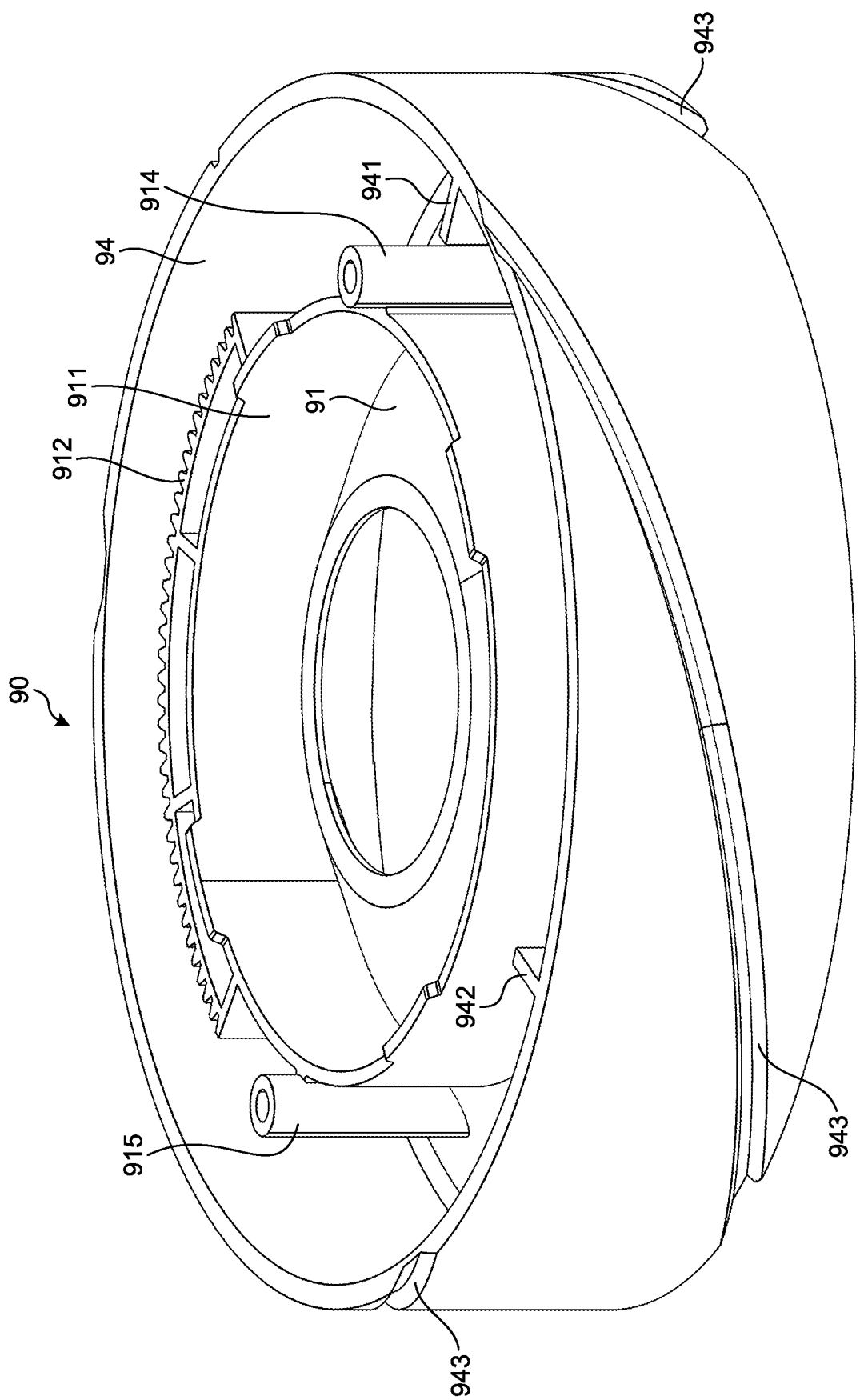
FIG. 25 is a perspective view illustrating a reflecting unit in the lighting apparatus according to the embodiment.

A configuration of a zooming mechanism will now be explained with reference to FIGS. 22 to 26. FIG. 22 is a plan view illustrating a principal part of the lamp head in the lighting apparatus according to the embodiment. Specifically, FIG. 22 is a plan view from a viewpoint facing the heat radiator unit 34, with the heat radiator unit 34 removed, so that the zooming mechanism is exposed. For example, FIG. 22 illustrates the side of the substrate 100 to which the heat radiator unit 34 is attached. FIG. 23 is a perspective view illustrating the rotation restricting unit in the lighting apparatus according to the embodiment. FIG. 24 is a perspective view illustrating an aiming unit in the lighting apparatus according to the embodiment. FIG. 25 is a perspective view illustrating a reflecting unit in the lighting apparatus according to the embodiment. FIG. 26 is a schematic illustrating the zooming mechanism, with a part thereof represented transparently, in the lighting apparatus according to the embodiment.

As illustrated in FIG. 22, the rotation restricting unit 70, an aiming unit 80, and the reflecting unit 90 are disposed inside of the holder unit 32. To the opening of the holder unit 32 (the front part in the FIG. 1), the disk-shaped cover unit 33 is attached. The cover unit 33 protects the inside of the holder unit 32.

The rotation restricting unit 70 includes a disk-shaped base portion 71 having an opening at the center, and a plurality of claws 72, 72 projecting from the circumferential wall of the base portion 71, in the axial direction of the base portion 71. In the example illustrated in FIG. 23, there are two claws 72, 72 projecting from the circumferential wall of the base portion 71, in the axial direction of the base portion 71. For example, these two claws 72, 72 are provided at an interval of 180 degrees, along the outer circumference of the base portion 71. The substrate 100 is disposed on the opening of the base portion 71. In other words, the substrate 100 is disposed on the base portion 71 of the rotation restricting unit 70, with the light-emitting surface facing the direction in which the claws 72, 72 project. For example, the substrate 100 is held by a holding member 101 such as a chip-on-board (COB) holder. A seal member may be provided to the outer circumferential part of the holding member 101. A third switch 73 is also provided to the base portion 71 of the rotation restricting unit 70.

The base portion 71 of the rotation restricting unit 70 is also provided with projecting portions 712, 713 projecting in the direction opposite to the projecting directions of the claws 72, 72. The projecting portions 712, 713 is inserted into an insertion hole provided to the holder unit 32, and the rotation restricting unit 70 is attached to the holder unit 32 via an attaching mechanism such as screws. With this configuration, the rotations of the rotation restricting unit 70 with respect to the holder unit 32 are restricted. As described earlier, the insertion hole 711 is provided to the base portion 71 of the rotation restricting unit 70, and the other-end side of the gear 67 is passed through the insertion hole 711. The other-end side of the gear 67 passed through the insertion hole 711 of the rotation restricting unit 70 is enmeshed with a gear portion 912 of the reflecting unit 90.

Insertion holes 714, 715 are provided along the circumferential direction of the base portion 71 of the rotation restricting unit 70. Screw members 7141, 7151 are inserted into the insertion holes 714, 715, respectively. The heads of the screw members 7141, 7151 have a size larger than the width of the insertion holes 714, 715, and the screw members 7141, 7151 are fitted into the insertion holes 714, 715, respectively. The screw members 7141, 7151 are also attached to the attaching portions 914, 915 of the reflecting unit 90, respectively. With this configuration, the reflecting unit 90 is allowed to rotate with respect to the rotation restricting unit 70, within the range in which the screw members 7141, 7151 can be moved inside of the respective insertion holes 714, 715. Furthermore, because the gear 67 rotated in response to the driving of the third motor 65 is enmeshed with the gear portion 912 of the reflecting unit 90, the reflecting unit 90 is also rotated in response to the driving of the third motor 65.

As illustrated in FIG. 24, the aiming unit 80 includes a tubular portion 81 having a cylindrical shape, and a flange 82 that is continuous to the tubular portion 81. For example, an optical member (not illustrated) such as a lens is disposed on the flange 82. To the tubular portion 81 of the aiming unit 80, a plurality of guide grooves 811, 812 are provided upright to the outer circumferential surface of the tubular portion 81. In the example illustrated in FIG. 24, two guide grooves 811, 812 are provided at an interval of 180 degrees, along the outer circumference of the tubular portion 81. In other words, the guide grooves 811, 812 are provided upright as a pair, in a manner facing each other, with respect to the axis of the tubular portion 81 of the aiming unit 80 at a center.

The guide grooves 811, 812 on the aiming unit 80 have shapes allowing the claws 72, 72 of the rotation restricting unit 70 to be inserted, and the claws 72, 72 of the rotation restricting unit 70 are inserted into the respective guide grooves 811, 812 provided to the aiming unit 80. With this structure, the guide grooves 811, 812 allow the aiming unit 80 to be advanced and retracted in the axial direction of the rotation restricting unit 70.

On the inner circumferential surface of the tubular portion 81 of the aiming unit 80, projections 813 are provided. For example, on the inner circumferential surface of the tubular portion 81 of the aiming unit 80, three projections 813 are provided at an equal interval, along the inner circumference of the tubular portion 81. For example, three projections 813 are provided at an interval of 120 degrees, along the inner circumference of the tubular portion 81. In the example illustrated in FIG. 24, the three projections 813 are provided along the upper edge of the inner circumferential surface of the tubular portion 81.

As illustrated in FIG. 26, the reflecting unit 90 is disposed inside the aiming unit 80, in a rotatable manner with respect to the aiming unit 80. As illustrated in FIG. 25, the reflecting unit 90 has a reflective surface 91. For example, the light from light source is emitted via the opening of the reflective surface 91, and the reflective surface 91 reflects the light emitted from the light source.

On the rear side, an outer wall 94 is provided upright to the outer circumferential edge of the reflective surface 91. In the example illustrated in FIG. 25, the outer wall 94 is provided upright, in a cylindrical shape, in a manner extending upwardly from the reflective surface 91. Also provided on the rear side is an inner wall 911 provided upright to the reflective surface 91. In the example illustrated in FIG. 25, the inner wall 911 is provided upright in a manner extending upwardly, in a cylindrical shape, from a position near the center between the opening and the outer circumferential edge of the reflective surface 91. A part of the outer circumference of the inner wall 911 is provided with the gear portion 912. For example, the gear portion 912 is provided to a range of 90 degrees about the center of the inner wall 911.

On the outer circumference of the outer wall 94 of the reflecting unit 90, a plurality of spiraling grooves 943 are provided. For example, on the outer circumference of the outer wall 94 of the reflecting unit 90, three grooves 943 are provided at an equal interval, along the outer circumference of the outer wall 94. For example, these three grooves 943 are provided at an interval of 120 degrees, along the outer circumference of the outer wall 94.

The rotations of the aiming unit 80 about the axis of the tubular portion 81 are restricted because the claws 72, 72 of the rotation restricting unit 70 are inserted into the guide grooves 811, 812. For example, in the example illustrated in FIG. 26, while the aiming unit 80 is movable in the direction following the axis of the tubular portion 81 (up-and-down direction), the rotations thereof about the axis extending in the up-and-down direction are restricted. By contrast, the reflecting unit 90 is rotated about the direction extending along the axis of the reflecting unit 90 (up-and-down direction), in response to the output from the third motor 65.

Therefore, when the reflecting unit 90 is rotated, as the positions of the grooves 943 of the reflecting unit 90 is changed, with the positions of the projections 813 of the aiming unit 80 in the rotating direction restricted, the positions of the projection 813 in the axial direction are changed. The aiming unit 80 converts the rotations about the axis of the reflecting unit 90 into a movement in the axial direction. With this configuration, the aiming unit 80 is advanced and retracted in the axial direction, as the aiming unit 80 rotates about the axis of the reflecting unit 90. With these advancements and the retractions of the aiming unit 80 in the axial direction, the distance between the substrate 100 and the optical member provided to the flange 82 of the aiming unit 80 is changed, so that the zooming function is implemented thereby.

In this embodiment, only the three grooves 943 are provided to the reflecting unit 90 at an interval of 120 degrees, within a range in which the aiming unit 80 is advanced and retracted. Furthermore, the three projections 813 that are enmeshed with the grooves 943 of the reflecting unit 90 are also provided on the aiming unit 80 at an interval of 120 degrees. By setting the number of the grooves 943 of the reflecting unit 90 to three, and setting the number of the projections 813 on the aiming unit 80 three, the aiming unit 80 is allowed to advance and to retract in a balanced manner, with three supporting points. Furthermore, the length of the projections 813 on the aiming unit 80 may be provided as a protrusions having the length to be engaged with the grooves 943 of the reflecting unit 90.

On the inner circumferential surface of the outer wall 94, a pair of projecting portions 941, 942 projecting inwardly are formed. The third switch 73 attached to the base portion 71 of the rotation restricting unit 70 is disposed at position where a lever (not illustrated) projects along the inner circumferential surface of the outer wall 94. Specifically, the third switch 73 is disposed at the position overlapping with the projecting portions 941, 942, in the circumferential direction of the outer wall 94. With this configuration, by allowing the lever of the third switch 73 to be pivoted by one of the projecting portions 941, 942 of the outer wall 94, the limits defining a specified rotational angle are detected, and the detections are used in motor control, e.g., to stop the operation of the third motor 65. In this embodiment, the rotational angle of the reflecting unit 90 is set to a range of substantially 90 degrees, by the third switch 73 and the projecting portions 941, 942 of the outer wall 94.

As described earlier, in the lighting apparatus 1, because the arm 20 rotates in the horizontal direction, the direction of the light emission (light axis) can be rotated in the horizontal direction while maintaining the inclination angle of the direction of the light emission with respect to the vertical direction. The operation of the first motor 47 rotating the arm 20 in the horizontal direction, and the operation of the second motor 61 rotating the lamp head 30 in the vertical direction are explained separately, but the control unit is capable of controlling the first motor 47, the second motor 61, and the third motor 65 via an operator's operation performed on a remote controller. For example, the lighting apparatus 1 is capable of performing the operation of rotating the arm 20 in the horizontal direction, and the operation of rotating the lamp head 30 in the vertical direction, simultaneously.

According to the embodiment, the lighting apparatus 1 includes the first motor 47 for driving the arm 20 into rotation in the horizontal direction, and the second motor 61 for driving the lamp head 30 into rotation in the vertical direction, inside of the arm 20.

Furthermore, the embodiment described above is not intended to limit the scope of the present invention in any way. Any combinations of the elements described above, combined as appropriate, still fall within the scope of the present invention. Furthermore, additional effects and modifications can be easily thought of by those skilled in the art. Therefore, broader embodiments of the present invention are not limited to the embodiment described above, and various modifications are still possible.

For example, the following configurations are possible. In a configuration in which a plurality of the lighting apparatus 1 is installed on the ceiling, for example, by connecting the lighting apparatuses 1 via wireless communication, the control unit can remotely control the lighting apparatuses 1 at the same time, via one remote controller. Furthermore, the control unit is not limited to remote operations via the wireless communication, and an operation unit operated by an operator may also be connected to the lighting apparatus 1 over the wire, for example.

Explained in the embodiment is an example of a ceiling-hanging lighting apparatus 1, but the present invention may be applied to a wall-hanging lighting apparatus. The motors used as the first motor 47 and the second motor 61 are not limited to the stepping motors, and DC motors, DC brushless motors, AC motors, or the like may also be used. In such a configuration as well, the current control performed by the control unit can be simplified by matching as the rotational angle (angular displacement) of the arm 20 in the horizontal direction, with the rotational angle (angular displacement) of the lamp head 30 in the vertical direction, or using equivalent angles. Furthermore, the light source is not limited to a light-emitting element such as an LED, and may be another type of light source such as a krypton lamp head.

Furthermore, the driving apparatus may be used in changing the orientation of any operation target, without limitation to the lamp head 30 including a light source, as disclosed as the lighting apparatus 1 according to the embodiment. For example, the operation target may be a surveillance camera. In the manner described above, the operation target may be any operation target as long as it is desirable to change the orientation thereof to a desired direction, and the driving apparatus can be used for such an operation target.

REFERENCE SIGNS LIST 1 lighting apparatus (example of driving apparatus)
10 housing box (supporting portion)
11 outer frame
12 top panel
13 first bracket
14 second bracket
15 first cap
16 second cap
20 arm
21 coupling portion
22 first arm portion
23 second arm portion
30 lamp head (example of operation target)
45 first base plate
47 first motor (another driving source)
48-1 idle gear (another gear)
481 gear portion
482 flange
49-1 biasing unit (another biasing unit)
491 attaching portion (base portion)
492 upright portion (base portion)
494 inserting portion
495 arm (abutting portion)
61 second motor (driving source)
611 second base plate
48-2 idle gear (target gear)
49-2 biasing unit
50 brake unit
51 keep solenoid
52 stopper member
526 receiving unit
54 braking gear (target gear)

The invention claimed is:

1. A driving apparatus comprising:
an arm that has one end supported by a support mechanism, and that includes an electric driving source;
an operation target that is attached to another end of the arm, the other end being an end on an opposite side of the one end, and that is enabled to be pivoted by the driving source about one rotational axis intersecting with a direction from the one end to the other end; and
a brake unit that secures immobility of a target gear that is a gear disposed on the arm, and that is rotated as the operation target is pivoted, when power supply to the driving source stops, wherein
the brake unit secures immobility of the target gear by being brought into contact with the target gear when power supply to the driving source stops, and
the brake unit is separated from the target gear when power is supplied to the driving source.

2. The driving apparatus according to claim 1, wherein
the brake unit includes a receiving unit provided with a gear, and
the brake unit secures immobility of the target gear when power supply to the driving source stops, by causing the target gear to be enmeshed with the gear of the receiving unit.

3. The driving apparatus according to claim 1, wherein the brake unit secures immobility of the target gear having an output shaft of the driving source as a rotational axis, when power supply to the driving source stops.

4. The driving apparatus according to claim 1, wherein the driving source is a stepping motor.

5. The driving apparatus according to claim 4, wherein number of teeth of the target gear is more than twice number of poles included in the stepping motor.

6. A lighting apparatus that is the driving apparatus according to claim 1 comprising a lamp head as the operation target.

7. The driving apparatus according to claim 1, wherein
the brake unit includes a receiving unit provided with a gear, and
the brake unit secures immobility of the target gear when power supply to the driving source stops, by causing the target gear to be enmeshed with the gear of the receiving unit.

8. A driving apparatus comprising:
an arm that has one end supported by a support mechanism, and that includes an electric driving source;
an operation target that is attached to another end of the arm, the other end being an end on an opposite side of the one end, and that is enabled to be pivoted by the driving source about one rotational axis intersecting with a direction from the one end to the other end; and
a brake unit that secures immobility of a target gear that is a gear disposed on the arm, and that is rotated as the operation target is pivoted, when power supply to the driving source stops, wherein
the driving source is a stepping motor, and
number of teeth of the target gear is more than twice number of poles included in the stepping motor.

* * * * *